(12) United States Patent
Okuyoshi et al.

(10) Patent No.: US 8,916,303 B2
(45) Date of Patent: Dec. 23, 2014

(54) FUEL CELL SYSTEM

(75) Inventors: Masahiro Okuyoshi, Toyota (JP);
Masaaki Matsusue, Mishima (JP);
Masashi Toida, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/163,234

(22) Filed: Jun. 17, 2011

(65) Prior Publication Data

US 2011/0274993 A1  Nov. 10, 2011

Related U.S. Application Data

(63) Continuation of application No. PCT/JP2008/073786, filed on Dec. 26, 2008.

(51) Int. Cl.
*H01M 8/04* (2006.01)

(52) U.S. Cl.
USPC ............ 429/414; 429/428; 429/431; 429/450

(58) Field of Classification Search
IPC ........... H01M 8/04,8/04223, 8/04231, 8/04253, H01M 8/04574, 8/04582
See application file for complete search history.

(56) References Cited

U.S. PATENT DOCUMENTS

| | | | |
|---|---|---|---|
| 6,120,925 A | 9/2000 | Kawatsu et al. | |
| 6,960,401 B2 | 11/2005 | Barton et al. | |
| 6,964,824 B2 | 11/2005 | Enjoji et al. | |
| 2002/0009623 A1 | 1/2002 | Jia et al. | |
| 2002/0180448 A1* | 12/2002 | Imamura et al. | 324/439 |
| 2002/0192520 A1 | 12/2002 | Nonobe | |
| 2005/0053814 A1* | 3/2005 | Imamura et al. | 429/22 |
| 2007/0092771 A1 | 4/2007 | Wake et al. | |
| 2007/0172720 A1* | 7/2007 | Mogi et al. | 429/44 |
| 2011/0244350 A1 | 10/2011 | Matsusue et al. | |

FOREIGN PATENT DOCUMENTS

| | | |
|---|---|---|
| JP | 2002-164069 A | 6/2002 |
| JP | 2002-231283 A | 8/2002 |
| JP | 2002-280027 A | 9/2002 |
| JP | 2003-331886 A | 11/2003 |
| JP | 2004-039551 A | 2/2004 |
| JP | 2004-111196 A | 4/2004 |
| JP | 2004-146236 A | 5/2004 |
| JP | 2004-146267 A | 5/2004 |
| JP | 2004-207139 A | 7/2004 |
| JP | 2004-335444 A | 11/2004 |

(Continued)

OTHER PUBLICATIONS

International Search Report issued Apr. 28, 2009 in PCT/JP2008/073786.

(Continued)

*Primary Examiner* — Alix Echelmeyer
(74) *Attorney, Agent, or Firm* — Kenyon & Kenyon LLP

(57) ABSTRACT

A fuel cell system includes: a fuel cell including a cell laminate; an estimating unit for estimating a residual water content distribution in the reactant gas flow channel in a cell plane of each of the single cells and a moisture content distribution in the electrolyte membrane in consideration of water transfer through the electrolyte membrane between the anode electrode and the cathode electrode; and an operation control unit for limiting an electric current drawn from the fuel cell when a residual water content in the reactant gas flow channel estimated by the estimating unit is equal to or above a predetermined threshold.

6 Claims, 19 Drawing Sheets

(56) References Cited

FOREIGN PATENT DOCUMENTS

| | | |
|---|---|---|
| JP | 2005-222854 A | 8/2005 |
| JP | 2006-073427 A | 3/2006 |
| JP | 2006-100093 A | 4/2006 |
| JP | 2006-120342 A | 5/2006 |
| JP | 2006-156059 A | 6/2006 |
| JP | 2006-156411 A | 6/2006 |
| JP | 2006-196262 A | 7/2006 |
| JP | 2006-202696 A | 8/2006 |
| JP | 2006-236862 A | 9/2006 |
| JP | 2006-526271 A | 11/2006 |
| JP | 2007-035389 A | 2/2007 |
| JP | 2007-048650 A | 2/2007 |
| JP | 2007-141812 A | 6/2007 |
| JP | 2007-149572 A | 6/2007 |
| JP | 2007-172953 A | 7/2007 |
| JP | 2007-173071 A | 7/2007 |
| JP | 2007-207560 A | 8/2007 |
| JP | 2007-207725 A | 8/2007 |
| JP | 2007-227212 A | 9/2007 |
| JP | 2007-287547 A | 11/2007 |
| JP | 2007-288850 A | 11/2007 |
| JP | 2007-305420 A | 11/2007 |
| JP | 2008-034136 A | 2/2008 |
| JP | 2008-041505 A | 2/2008 |
| JP | 2008-041625 A | 2/2008 |
| JP | 2008-053168 A | 3/2008 |
| JP | 2008-091329 A | 4/2008 |
| JP | 2008-130444 A | 6/2008 |
| JP | 2008-140734 A | 6/2008 |
| JP | 2008-251489 A | 10/2008 |
| JP | 2008-282616 A | 11/2008 |
| JP | 2008-293805 A | 12/2008 |
| JP | 2009-004151 A | 1/2009 |

OTHER PUBLICATIONS

International Search Report for PCT/JP2008/073782 dated Apr. 28, 2009.
International Search Report for PCT/JP2008/073784 dated Apr. 28, 2009.
International Search Report for PCT/JP2008/073791 dated Apr. 28, 2009.
English Translation of IPRP for PCT/JP2008/073791 dated Nov. 9, 2011.
Office Action for U.S. Appl. No. 13/163,315 dated Oct. 24, 2011.
Final Office Action for U.S. Appl. No. 13/163,315 dated Jan. 27, 2012.
Advisory Action for U.S. Appl. No. 13/163,315 dated Apr. 4, 2012.
Office Action for U.S. Appl. No. 13/163,315 dated Sep. 17, 2012.
Office Action for U.S. Appl. No. 13/163,381 dated Oct. 26, 2011.
Final Office Action for U.S. Appl. No. 13/163,381 dated Mar. 28, 2012.
Office Action for U.S. Appl. No. 13/163,083 dated Nov. 9, 2011.
Office Action for U.S. Appl. No. 13/106,629 dated Nov. 9, 2011.
Final Office Action for U.S. Appl. No. 13/106,629 dated Apr. 10, 2012.
Notice of Allowance issued on Nov. 22, 2013 in U.S. Appl. No. 13/106,629.

* cited by examiner

FIG. 14

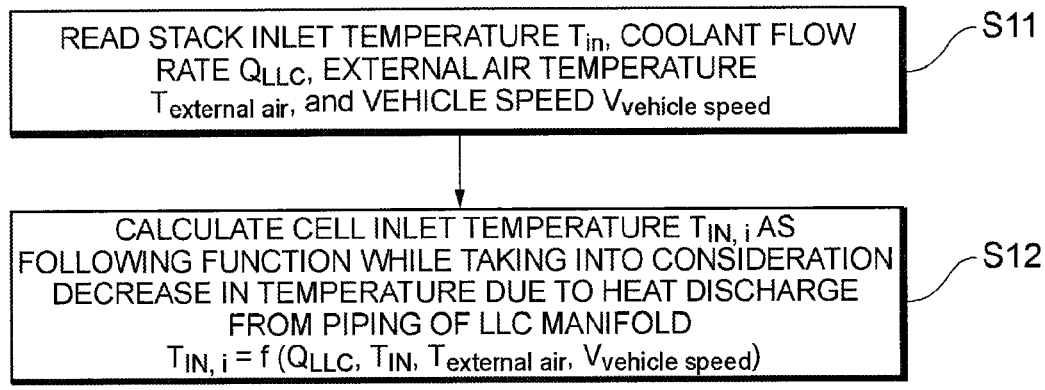

S11: READ STACK INLET TEMPERATURE $T_{in}$, COOLANT FLOW RATE $Q_{LLC}$, EXTERNAL AIR TEMPERATURE $T_{external\ air}$, and VEHICLE SPEED $V_{vehicle\ speed}$ S12: CALCULATE CELL INLET TEMPERATURE $T_{IN,\ i}$ AS FOLLOWING FUNCTION WHILE TAKING INTO CONSIDERATION DECREASE IN TEMPERATURE DUE TO HEAT DISCHARGE FROM PIPING OF LLC MANIFOLD
$T_{IN,\ i} = f(Q_{LLC}, T_{IN}, T_{external\ air}, V_{vehicle\ speed})$

FIG. 15A

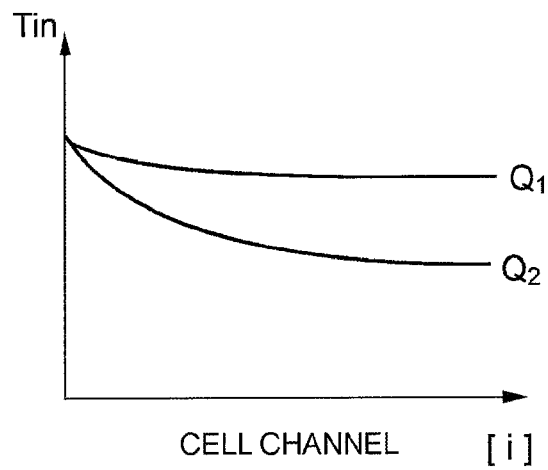

FIG. 15B

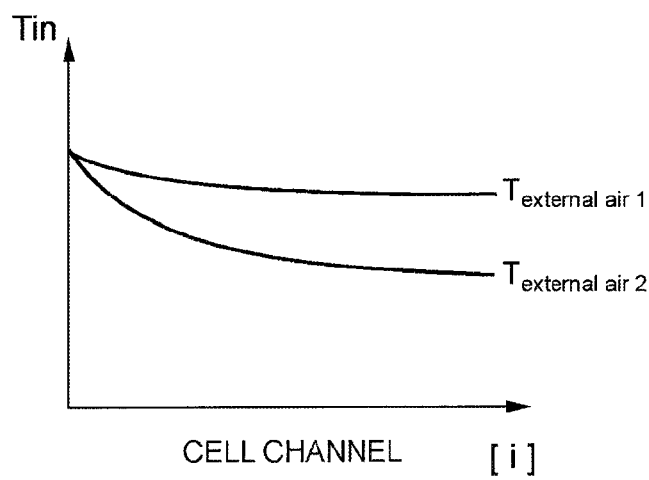

FIG. 16

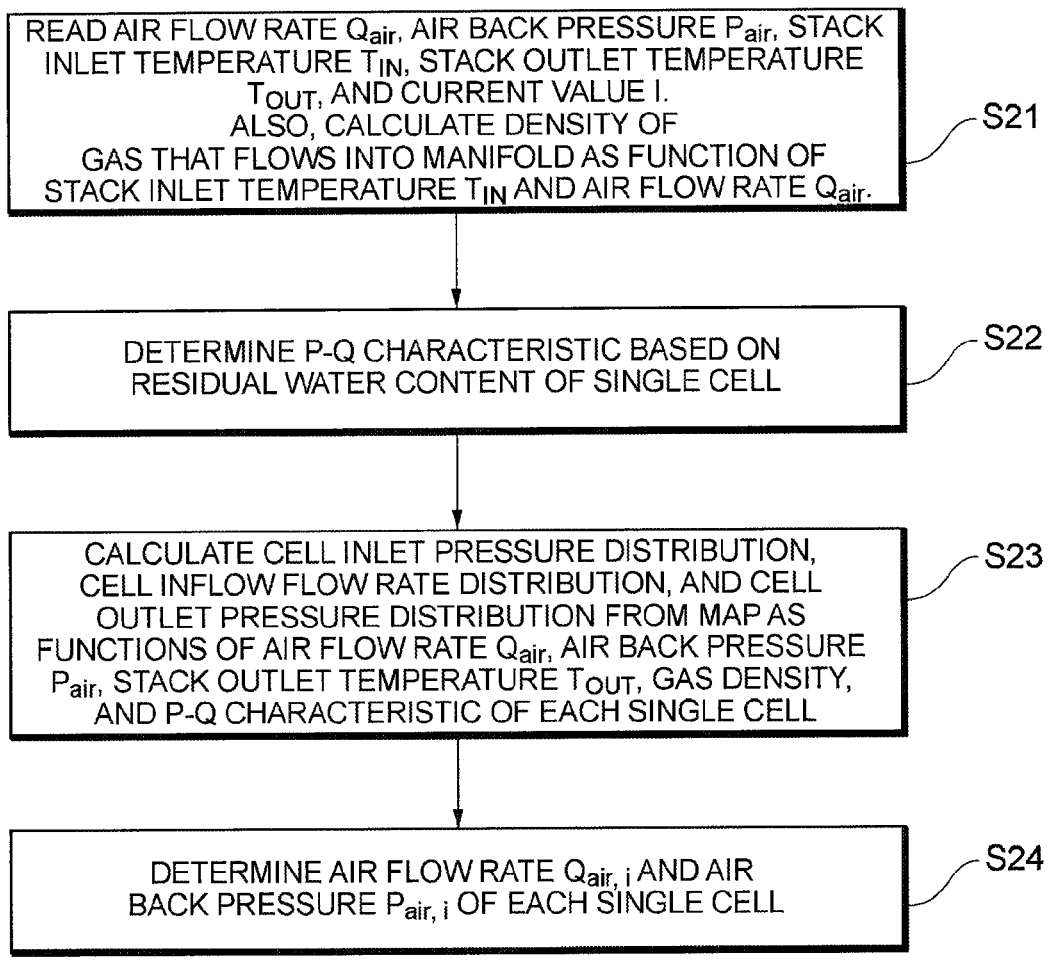

S21: READ AIR FLOW RATE $Q_{air}$, AIR BACK PRESSURE $P_{air}$, STACK INLET TEMPERATURE $T_{IN}$, STACK OUTLET TEMPERATURE $T_{OUT}$, AND CURRENT VALUE I. ALSO, CALCULATE DENSITY OF GAS THAT FLOWS INTO MANIFOLD AS FUNCTION OF STACK INLET TEMPERATURE $T_{IN}$ AND AIR FLOW RATE $Q_{air}$.

S22: DETERMINE P-Q CHARACTERISTIC BASED ON RESIDUAL WATER CONTENT OF SINGLE CELL

S23: CALCULATE CELL INLET PRESSURE DISTRIBUTION, CELL INFLOW FLOW RATE DISTRIBUTION, AND CELL OUTLET PRESSURE DISTRIBUTION FROM MAP AS FUNCTIONS OF AIR FLOW RATE $Q_{air}$, AIR BACK PRESSURE $P_{air}$, STACK OUTLET TEMPERATURE $T_{OUT}$, GAS DENSITY, AND P-Q CHARACTERISTIC OF EACH SINGLE CELL S24: DETERMINE AIR FLOW RATE $Q_{air, i}$ AND AIR BACK PRESSURE $P_{air, i}$ OF EACH SINGLE CELL

FIG. 17

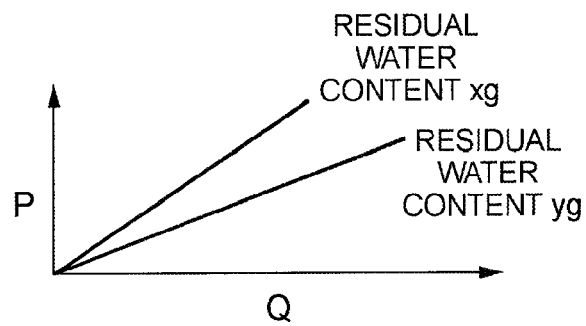

FUEL CELL SYSTEM

This is a continuation application of PCT/JP2008/073786 filed 26 Dec. 2008, the content of which is incorporated herein by reference.

TECHNICAL FIELD

The present invention relates to a fuel cell system using estimation of a moisture content in a proton-exchange membrane fuel cell.

BACKGROUND ART

As conventionally well-known, in order to efficiently generate electricity in a proton-exchange membrane fuel cell, it is desirable to keep the electrolyte membrane moderately wet and avoid an excessive or insufficient moisture content in the fuel cell. There is a known technique of controlling a moisture content in a cell plane of a fuel cell, as described in Patent Document 1 (Japanese Patent Laid-Open No. 2004-335444), for example. Patent Document 1 discloses adjusting one of pressure drop characteristics due to pressure, humidity, temperature, flow rate, and flow channel geometry of reactant gas, which is a general term for oxidation gas represented by air and fuel gas represented by hydrogen gas, to control the distribution of moisture content present in the cell plane as droplet or water vapor.

DISCLOSURE OF THE INVENTION

Problems to be Solved by the Invention

In an actual single cell, however, there is migration of moisture through the electrolyte membrane between the anode electrode and the cathode electrode. In this respect, since water transfer between electrodes is not taken into consideration in Patent Document 1, it is difficult to accurately estimate and control a water content distribution in the cell plane.

Further, generally, a large amount of residual water content present as liquid water in a reactant gas flow channel prevents the reactant gas flow, which means that pressure drop increases. In such state, an attempt to draw an output current from the fuel cell according to a requested output may cause cell voltage to drop in a single cell having a larger amount of residual water content, resulting in degradation of a catalyst in an electrode. In the case of too much residual water content, therefore, it is preferable to limit the output current; however, initially poor estimation accuracy makes it difficult to accurately limit an electric current.

It is an object of the present invention to provide a fuel cell system with improved accuracy of estimating a residual water content so that an electric current can be accurately limited.

Means for Solving the Problems

To attain the above object, a fuel cell system according to the present invention includes: a fuel cell including a cell laminate formed by laminating a plurality of single cells, each of the single cells having an anode electrode, a cathode electrode, and an electrolyte membrane existing between the anode electrode and the cathode electrode, and a reactant gas flow channel; an estimating unit for estimating a residual water content distribution in the reactant gas flow channel and a moisture content distribution in the electrolyte membrane in a cell plane of each single cell while taking into consideration water transfer that occurs between the anode electrode and the cathode electrode via the electrolyte membrane; and an operation control unit which limits an electric current drawn from the fuel cell when the residual water content in the reactant gas flow channel estimated by the estimating unit is equal to or greater than a predetermined threshold.

According to the present invention, since water transfer between the electrodes is taken into consideration, the accuracy of estimating a moisture content and a residual water content can be improved. Further, since the improved estimation result is used to limit an electric current, the current can be accurately limited, and degradation of the fuel cell due to cell voltage drop can be suppressed, for example.

Preferably, the operation control unit may change the level of current limiting for the fuel cell depending on the location where a residual water content is equal to or greater than the threshold.

In this way, a larger amount of power generation can be assured than when the level of current limiting is constant, and the efficiency can be improved.

Here, whether water in the reactant gas flow channel can be discharged with the reactant gas is dependent on the location in the cell lamination direction and the location in the cell plane. Since cell voltage drop may be anticipated if water is accumulated in the location where water cannot be easily discharged, the current limiting value may be decreased. On the other hand, if water is accumulated in the location where water can easily be discharged, a larger current limiting value can be used to assure a correspondingly larger amount of power generation.

Therefore, in the case where the cell laminate according to a preferred aspect of the invention is configured so that reactant gas is supplied to the reactant gas flow channel of each single cell by having the reactant gas supplied in the cell lamination direction, the operation control unit may decrease the current limiting value, which corresponds to the level of current limiting, as the location where a residual water content is equal to or greater than the threshold is a single cell located farther away on the downstream side in the supply direction of the reactant gas in the cell laminate. Similarly, the operation control unit preferably increases the current limiting value, as the location where a residual water content is equal to or greater than the threshold is a single cell located farther away on the upstream side in the supply direction of the reactant gas in the cell laminate. Further, the operation control unit may decrease the current limiting value, as the location where a residual water content is equal to or greater than the threshold is located farther away on the reactant gas inlet side of the reactant gas flow channel in the cell plane, and may increase the current limiting value, as the location where a residual water content is equal to or greater than the threshold is located farther away on the reactant gas outlet side of the reactant gas flow channel in the cell plane.

According to such a configuration, a current limiting value can be set in consideration of cell voltage and the amount of power generation depending on the location in the cell lamination direction and the location in the cell plane.

More preferably, when a residual water content equal to or greater than the threshold does not decrease or does increase over time, the operation control unit may decrease the current limiting value.

The degradation of the fuel cell due to cell voltage drop can thereby be suppressed.

Preferably, the reactant gas flow channel may have a fuel gas flow channel for supplying fuel gas to the anode electrode and an oxidation gas flow channel for supplying oxidation gas to the cathode electrode, and the threshold differs between the side of the fuel gas flow channel and the side of the oxidation gas flow channel.

Consequently, a suitable threshold can be used for characteristics of the fuel gas flow channel side and the oxidation gas flow channel, respectively, and the accuracy of current limiting can be improved.

Preferably, the operation control unit may decrease the current limiting value for the fuel cell, as there is a larger amount of residual water content equal to or greater than the threshold.

In this way, when a residual water content equal to or greater than the threshold is relatively small, a larger amount of power generation can be assured, while when a residual water content equal to or greater than the threshold is relatively large, cell voltage drop may reliably be suppressed.

Preferably, the estimating unit may estimate the residual water content distribution and the moisture content distribution at the startup of the fuel cell system, and the operation control unit may limit an electric current drawn from the fuel cell at the startup of the fuel cell system.

Preferably, when a residual water content in the reactant gas flow channel estimated by the estimating unit is equal to or greater than the threshold, the operation control unit may limit an electric current drawn from the fuel cell after scavenging process on the fuel cell.

In this way, since the residual water content can be reduced by the scavenging process, it is not necessary to decrease the current limiting value after power generation is started, and time needed for current limiting can be reduced.

BEST MODE FOR CARRYING OUT THE INVENTION

Hereinafter, a preferred embodiment of the present invention will be described with reference to the accompanying drawings. First, an overview of a fuel cell system including a fuel cell and a water content estimation apparatus thereof for the fuel cell will be described, followed by a description of an estimation of a water content of a fuel cell and a control example using the estimation. Hereinafter, hydrogen gas will be described as an example of a fuel gas and air will be described as an example of an oxidation gas. A fuel gas and an oxidation gas may collectively be described as a reactant gas.

A. Overview of Fuel Cell

As illustrated in FIGS. 1 and 2, a fuel cell 1 with a stack structure includes a cell laminate 3 formed by laminating a plurality of single cells 2 of the proton-exchange membrane type. Collector plates 5a, 5b, insulating plates 6a, 6b, and end-plates 7a, 7b are respectively arranged on outer sides of single cells 2 on both ends of the cell laminate 3 (hereinafter, referred to as "end cells 2a"). Tension plates 8, 8 are bridged across the end-plates 7a, 7b and fixed by a bolt 9. An elastic module 10 is provided between the end-plate 7b and the insulating plate 6b.

Hydrogen gas, air, and a coolant are supplied to a manifold 15a inside the cell laminate 3 from a supply pipe 14 connected to supply ports 11a, 12a, and 13a of the end-plate 7a. Subsequently, the hydrogen gas, air, and the coolant flow in a planar direction of the single cell 2 and reach a manifold 15b inside the cell laminate 3, and are discharged to the outside of the fuel cell 1 from an exhaust pipe 16 connected to exhausts 11b, 12b and 13b of the end-plate 7a. Note that although the supply pipe 14, the manifolds 15a, 15b, and the exhaust pipe 16 are provided corresponding to each fluid (hydrogen gas, air, and coolant), same reference characters are assigned in FIG. 2 and descriptions thereof are omitted.

As illustrated in FIG. 3, the single cell 2 includes an MEA 20 and a pair of separators 22A, 22B. The MEA 20 (Membrane Electrode Assembly) is constituted by an electrolyte membrane 23 made of an ion-exchange membrane, and an anode electrode 24A and a cathode electrode 24B which sandwich the electrolyte membrane 23. A hydrogen flow channel 25A of the separator 22A faces the electrode 24A while an air flow channel 25B of the separator 22B faces the electrode 24B. In addition, coolant flow channels 26A, 26B of the separators 22A, 22B communicate with each other between adjacent single cells 2, 2.

FIG. 4 is a plan view of the separator 22A. The separator 22A includes a hydrogen inlet 27a, an air inlet 28a, a coolant inlet 29a, a hydrogen outlet 27b, an air outlet 28b, and a coolant outlet 29b respectively penetratingly formed on an outer side of the hydrogen flow channel 25A. Inlets 27a, 28a, and 29a constitute a part of the manifold 15a that corresponds to each fluid. In the same manner, outlets 27b, 28b, and 29b constitute a part of the manifold 15b that corresponds to each fluid.

At the separator 22A, hydrogen gas is introduced into a hydrogen flow channel 40 from the inlet 27a and discharged to the outlet 27b. The coolant flows in a similar manner. In addition, while a detailed description will not be given, air also flows in a planar direction in the separator 22B configured similar to the separator 22A. In this manner, hydrogen gas and air are supplied to the electrodes 24A, 24B in the single cell 2 to cause an electrochemical reaction inside the MEA 20 which produces electromotive force. Furthermore, the electrochemical reaction also generates water and heat on the side of the electrode 24B. The heat at each single cell 2 is reduced due to subsequent flow of the coolant.

FIGS. 5A to 5C are schematic plan views illustrating other flow channel geometries of a separator to which the present embodiment is applicable. In place of the mode of the straight gash flow channel (repetitive concavities and convexities extending in a single direction) illustrated in FIG. 4, the flow channel geometries of the flow channels 25A, 25B, 26A, and 26B can take a serpentine flow channel shape having folded portions midway as illustrated in FIG. 5A. In addition, as illustrated in FIG. 5B, the flow channels 25A, 25B, 26A, and 26B can take a wavy form or, as illustrated in FIG. 5C, a flat plate-like form without concavities and convexities. Furthermore, as for the flow pattern of the reactant gas, a counter-flow type in which hydrogen gas and air flow in opposite directions may be adopted in place of the coflow type (in which hydrogen gas and air flow in the same direction) as can be understood from FIGS. 1 and 4. Moreover, the separators 22A, 22B may be oriented either vertically or horizontally. In other words, estimation of a water content of the fuel cell 1 to be described later is not limited to a hardware configuration of the fuel cell 1.

B. Overview of Fuel Cell System

As illustrated in FIG. 6, a fuel cell system 100 includes an air piping system 300, a hydrogen piping system 400, a coolant piping system 500, and a controller 600. In addition to being mountable on various mobile objects such as a vehicle, a ship, an airplane, and a robot, the fuel cell system 100 is applicable to a stationary power source. Here, an example of the fuel cell system 100 mounted on a vehicle will be described.

The air piping system 300 is responsible for supplying air to and discharging air from the fuel cell 1, and includes a humidifier 30, a supply flow channel 31, an exhaust flow channel 32, and a compressor 33. Atmospheric air (air in a low moisture condition) is taken in by the compressor 33 and force-fed to the humidifier 30. Water exchange between atmospheric air and an oxidation off-gas in a high moisture condition is performed at the humidifier 30. As a result, adequately humidified air is supplied from the supply flow channel 31 to the fuel cell 1. A back pressure valve 34 for regulating an air back pressure of the fuel cell 1 is provided at the exhaust flow channel 32. In addition, a pressure sensor P1 for detecting an air back pressure is provided in the vicinity of the back pressure valve 34. A flow rate sensor F1 for detecting an air supply flow rate to the fuel cell 1 is provided at the compressor 33.

The hydrogen piping system 400 is responsible for supplying hydrogen gas to and discharging hydrogen gas from the fuel cell 1, and includes a hydrogen supply source 40, a supply flow channel 41, a circulatory flow channel 42, a shut valve 43, and the like. After hydrogen gas from the hydrogen supply source 40 is depressurized by a regulator 44, a flow rate and pressure of the hydrogen gas are regulated with high accuracy by an injector 45. Subsequently, hydrogen gas merges with a hydrogen off-gas force-fed by a hydrogen pump 46 on the circulatory flow channel 42 at a confluence A to be supplied to the fuel cell 1. A purge channel 47 with a purge valve 48 is branchingly connected to the circulatory flow channel 42. The hydrogen off-gas is discharged to the exhaust flow channel 32 by opening the purge valve 48. A pressure sensor P2 that detects a supply pressure of hydrogen gas to the fuel cell 1 is provided on a downstream-side of the confluence A. In addition, a flow rate sensor F2 is provided on the hydrogen pump 46. Moreover, in other embodiments, a fuel off-gas may be introduced to a hydrogen diluter or a gas-liquid separator may be provided at the circulatory flow channel 42.

The coolant piping system 500 is responsible for circulating a coolant (for example, cooling water) to the fuel cell 1, and includes a cooling pump 50, a coolant flow channel 51, a radiator 52, a bypass flow channel 53, and a switching valve 54. The cooling pump 50 force-feeds a coolant inside the coolant flow channel 51 into the fuel cell 1. The coolant flow channel 51 includes a temperature sensor T1 located on a coolant inlet-side of the fuel cell 1 and a temperature sensor T2 located on a coolant outlet-side of the fuel cell 1. The radiator 52 cools the coolant discharged from the fuel cell 1. The switching valve 54 is made of, for example, a rotary valve and switches coolant conduction between the radiator 52 and the bypass flow channel 53 as required.

The controller 600 is configured as a microcomputer internally provided with a CPU, a ROM, and a RAM. Detected information from the sensors (P1, P2, F1, F2, T1, and T2) that detect pressure, temperature, flow rate, and the like of fluids flowing through the respective piping systems 300, 400, and 500 are inputted to the controller 600. In addition, detected information of a current sensor 61 that detects a value of a current generated by the fuel cell 1, as well as detected information from an external air temperature sensor 62, a vehicle speed sensor 63, an accelerator opening sensor, and the like, are inputted to the controller 600. In response to such detected information and the like, the controller 600 controls the various devices (the compressor 33, the shut valve 43, the injector 45, the hydrogen pump 46, the purge valve 48, the cooling pump 50, the switching valve 54, and the like) in the system 100 so as to integrally control operations of the fuel cell system 100. Furthermore, the controller 600 reads various detected information, and estimates a water content of the fuel cell 1 using various maps stored in the ROM.

As illustrated in FIG. 7, the controller 600 includes a storage unit 65, a detecting unit 66, an estimating unit 67, and an operation control unit 68 as function blocks for estimating the water content of the fuel cell 1 and realizing control based on the estimation. The storage unit 65 stores various programs and various maps for estimating a water content of the fuel cell 1 and realizing control of the fuel cell 1. The maps are to be obtained in advance by experiment or simulation. The detecting unit 66 reads detected information of the various sensors (P1, P2, F1, F2, T1, T2, and 61 to 63) and the like. Based on an estimation result by the estimating unit 67, the operation control unit 68 transmits control instructions to the various devices and controls operation so as to place the fuel cell 1 in a desired operational state (for example, a water condition, a temperature condition, or the like). At this point, as required, the operation control unit 68 executes control that distinguishes between the anode side and the cathode side.

Based on the information acquired by the detecting unit 66, the estimating unit 67 references the various maps in the storage unit 65 to estimate a water content of the fuel cell 1. More specifically, the estimating unit 67 estimates a residual water content distribution and a moisture content distribution in a cell plane of the single cell 2 while taking into consideration water transfer that occurs between the electrodes 24A and 24B via the electrolyte membrane 23. In addition, the estimating unit 67 also estimates a residual water content distribution and a moisture content distribution of each single cell 2 in a lamination direction (hereinafter, referred to as cell lamination direction).

Here, "in a cell plane" refers to the inside of a single cell 2 in a planar direction (a direction parallel to a plane of paper of FIG. 4 and perpendicular to the cell lamination direction) of the single cell 2. "Residual water content" refers to an amount of liquid water existing in the reactant gas flow channel of the single cell 2. "Reactant gas flow channel" is a concept that collectively designates the hydrogen flow channel 25A and the air flow channel 25B. "Moisture content" refers to an amount of water contained in the electrolyte membrane 23 of the single cell 2.

C. Estimation Method of Water Content of Fuel Cell

A water content estimation method according to the present embodiment involves separately estimating a residual water content and a moisture content and, in doing so, estimating a residual water content distribution separately for the anode side and the cathode side. In addition, distributions of a residual water content and a moisture content in the cell lamination direction are estimated in addition to distributions in a cell plane. Hereinafter, firstly, an estimation method of water distribution (a residual water content distribution and a moisture content distribution) in a cell plane will be described. Subsequently, a description will be given on how temperature variation and flow distribution variation in the cell lamination direction are considered during estimation, followed by a description on a water distribution estimation method in the cell lamination direction.

1. Estimation Method of Water Distribution in a Cell Plane

As illustrated in FIG. 8, firstly, a current value I, a cell inlet temperature $T_{in, i}$, a cell outlet temperature $T_{OUT, i}$, an air flow rate $Q_{air, i}$, a hydrogen flow rate $Q_{H2, i}$, an air back pressure $P_{air, i}$, and a hydrogen pressure $P_{H2, i}$ are read (step S1).

Here, the current value I is a value detected by the current sensor 61. The subscript "i" in cell inlet temperature $T_{in, i}$ and the like designates the cell channel indicating a position of the single cell 2 in the cell laminate 3. More specifically, in a case where the cell laminate 3 illustrated in FIG. 9 is taken as a model, a cell channel "i" of an end cell 2a nearest to the supply port (corresponding to the supply ports 11a and 12a in FIG. 1) and the exhaust (corresponding to the exhausts 11b and 12b in FIG. 1) of the reactant gas takes a value of 1. In a case where 200 single cells 2 are laminated, the cell channel "i" of the other end cell 2a takes a value of 200.

The cell inlet temperature $T_{in, i}$ and the cell outlet temperature $T_{OUT, i}$ respectively indicate coolant temperatures at the coolant inlet $29a$ and the coolant outlet $29b$ of the single cell $2$ (cell channel: i). The air flow rate $Q_{air, i}$ and the hydrogen flow rate $Q_{H2, i}$ respectively indicate supply flow rates of air and hydrogen gas which flow into the air inlet $28a$ and the hydrogen inlet $27a$ of the single cell $2_i$. The air back pressure $P_{air, i}$ and the hydrogen pressure $P_{H2, i}$ respectively indicate pressures of air and hydrogen gas at the air outlet $28b$ and the hydrogen inlet $27a$ of the single cell $2_i$. The following applies in a case where the fuel cell has only one single cell $2$ or in a case where temperature variation and flow distribution variation in the cell lamination direction are not considered.

$T_{in, i}$: detected value by the temperature sensor T1
$T_{OUT, i}$: detected value by the temperature sensor T2
$Q_{air, i}$: detected value by the flow rate sensor F1
$Q_{H2, i}$: hydrogen supply flow rate calculated from a detected value by the flow rate sensor F2
$P_{air, i}$: detected value by the pressure sensor P1
$P_{H2, i}$: detected value by the pressure sensor P2

On the other hand, in a case where the fuel cell $1$ includes a plurality of single cells $2$, heat discharge, pressure drop, and the like differ depending on positions in the cell lamination direction. Therefore, a heat discharge variation and flow distribution variations of the reactant gas and the coolant exist among the single cells $2$. Accordingly, a cell inlet temperature $T_{in, i}$ and the like which take the above into consideration are desirably used. The method of consideration will be described later.

Values from sensors other than those described above or values calculated by other calculation methods may be used as the respective detected values used as the cell inlet temperature $T_{in, i}$ and the like. In other words, a temperature sensor, a flow rate sensor, and a pressure sensor may be provided at positions other than those illustrated in FIG. $6$ and design changes to the numbers and positions thereof may be performed as appropriate. For example, a hydrogen flow rate sensor may be provided near the hydrogen supply port $11a$ of the fuel cell $1$ and a detected value of the sensor be used as the hydrogen flow rate $Q_{H2, i}$. In addition, the cell inlet temperature $T_{in, i}$ and the cell outlet temperature $T_{OUT, i}$ can also be estimated by mounting temperature sensors to the end cell $2a$ or the end-plates $7a$, $7b$. As shown, by measuring a temperature of the fuel cell stack itself as opposed to a temperature of the coolant, water estimation can be performed with higher accuracy.

In step S2 illustrated in FIG. 8, a cathode inlet dew point $T_{d, CA}$ and an anode inlet dew point $T_{d, AN}$ of each single cell $2_i$ are calculated from the cell inlet temperature $T_{in, i}$. In the present embodiment, since the humidifier $30$ is used in the fuel cell system $1$, the cell inlet temperature $T_{in, i}$ can be used as the cathode inlet dew point $T_{d, CA}$ and the anode inlet dew point $T_{d, AN}$, respectively. In other words, in a case where the air inlet $28a$ and the hydrogen inlet $27a$ are close to the coolant inlet $29a$, the following expression becomes true and a lamination variation of dew points can be taken into consideration.

$$T_{d,CA} = T_{d,AN} = T_{in,i}$$

Moreover, in step S2, the cathode inlet dew point $T_{d, CA}$ and the anode inlet dew point $T_{d, AN}$ of each single cell $2_i$ can be calculated from the cell outlet temperature $T_{out, i}$. Furthermore, in another embodiment, a dew-point meter may be used. For example, in a case where a humidifier is not used in the fuel cell system $1$ or in a case where the cell inlet temperature $T_{in, i}$ is not used, dew-point meters may respectively be installed at stack inlets (the anode-side supply port $11a$ and the cathode-side supply port $12a$) of the fuel cell $1$ and the detected values of the dew-point meters be set as the cathode inlet dew point $T_{d, CA}$ and the anode inlet dew point $T_{d, AN}$. Such a configuration enables estimation with higher accuracy.

In addition, in an air non-humidification system in which the humidifier $30$ is not mounted on the air piping system $300$, the cathode inlet dew point $T_{d, CA}$ may be calculated as being $0°$ C. Alternatively, the cathode inlet dew point $T_{d, CA}$ may be calculated by a function of external air temperature and external humidity using an external air temperature sensor and an external humidity sensor. In other words, the present estimation method can also be applied to a non-humidification system.

In step S3 illustrated in FIG. 8, a water transfer rate $V_{H2O, CA \to AN}$ between the electrodes $24A$, $24B$ is determined. The water transfer rate $V_{H2O, CA \to AN}$ is calculated as follows.

$$V_{H2O,CA \to AN} = D_{H2O} \times (P_{H2O,CA} - P_{H2O,AN})$$

In the above expression, $P_{H2O, CA}$ is a water vapor partial pressure on the side of the electrode $24B$ of the single cell $2_i$ and is calculated from the cathode inlet dew point $T_{d, CA}$. In addition, $P_{H2O, AN}$ is a water vapor partial pressure on the side of the electrode $24A$ of the single cell $2_i$ and is calculated from the anode inlet dew point $T_{d, AN}$. $D_{H2O}$ denotes water diffusivity in the electrolyte membrane $23$. While a constant value can be used as $D_{H2O}$, since variances occur due to humidity, such variances are desirably taken into consideration.

For example, a characteristic map representing a relationship between a relative humidity of the electrolyte membrane $23$ and $D_{H2O}$ such as that illustrated in FIG. 10 may be created in advance, and using the characteristic map, a value of $D_{H2O}$ corresponding to the relative humidity of the electrolyte membrane $23$ may be used. More specifically, a value ($\beta$) of $D_{H2O}$ to be used in an upcoming estimation can be determined from the map using a relative humidity $\alpha$ of the electrolyte membrane $23$ estimated upon shutdown of a previous operation of the fuel cell $1$, a relative humidity $\alpha$ of the electrolyte membrane $23$ estimated during a downtime (suspension) of the fuel cell $1$, or a relative humidity $\alpha$ of the electrolyte membrane $23$ estimated at the fuel cell $1$ immediately before the upcoming estimation.

In step S4 illustrated in FIG. 8, a current density $i_x$ (where x is any natural number) is calculated using a map from the water transfer rate $V_{H2O, CA \to AN}$, the dew point $T_{d, CA}$, the dew point $T_{d, AN}$, the temperature $T_{OUT, i}$, the air back pressure $P_{air, i}$, the hydrogen pressure $P_{H2, i}$, the air flow rate $Q_{air, i}$, the hydrogen flow rate $Q_{H2, i}$, and the current value I. The current density $i_x$ is a current density over an arbitrary area in the cell plane. For example, if respective areas for x=4 are to be denoted as $s_1$ to $s_4$, then $I = i_1 \times s_1 + i_2 \times s_2 + i_3 \times s_3 + i_4 \times s_4$. An example of a calculation result of a distribution of the current density $i_x$ is illustrated in FIG. 11.

In addition, a current distribution and a relative humidity distribution in a cell plane are calculated in step S4. Functions I and RH which represent the distributions may be expressed as follows. Moreover, sensitivities of the functions I and RH with respect to each parameter ($T_{d, CA}$, $T_{d, AN}$, $T_{OUT, i}$, $P_{air, i}$, $P_{H2, i}$, $Q_{air, i}$, $Q_{H2, i}$, $V_{H2O, CA \to AN}$, $i_x$) are to be mapped in advance. In addition, an overvoltage distribution in the cell plane may also be calculated based on the parameters.

$$I = f(T_{d,CA}, T_{d,AN}, T_{OUT,i}, P_{air,i}, P_{H2,i}, Q_{air,i}, Q_{H2,i}, V_{H2O,CA \to AN}, i_x)$$

$$RH = f(T_{d,CA}, T_{d,AN}, T_{OUT,i}, P_{air,i}, P_{H2,i}, Q_{air,i}, Q_{H2,i}, V_{H2O,CA \to AN}, i_x)$$

FIG. 12 is a diagram illustrating an example of relative humidity distributions (relative humidity distributions of the reactant gas flow channel and the electrolyte membrane) in a cell plane calculated in step S4. In the present embodiment, a counterflow flow channel mode is taken as an example so that flows of hydrogen gas and air are shown in relation to a position in a cell plane in FIG. 12. As illustrated in FIG. 12, while relative humidity has exceeded 100% and is in a supersaturated state from the hydrogen inlet 27a to the hydrogen outlet 27b in an AN flow channel (the hydrogen flow channel 25A), relatively humidity is below 100% on the side of the air outlet 28b in a CA flow channel (the air flow channel 25B). In addition, a central part (a central part of the single cell 2) of the electrolyte membrane 23 is in a supersaturated state.

In step S5 illustrated in FIG. 8, a degree of supersaturation $\sigma_1$ (an amount corresponding to relative humidity over 100%) and a degree of undersaturation $\sigma_2$ (an amount corresponding to relative humidity under 100%) are respectively calculated for the anode side and the cathode side from the relative humidity distribution result illustrated in FIG. 12, and a liquid water generation rate $V_{vap \to liq}$ and a liquid water evaporation rate $V_{liq \to vap}$ are calculated from the expressions given below. $V_{vap \to liq}$ and $V_{liq \to vap}$ in the hydrogen flow channel 25A and the air flow channel 25B are respectively calculated in consideration of the fact that phases (gas phase, liquid phase) of water vary in the reactant gas flow channel.

$$V_{vap \to liq} = k_1 \times \sigma_1$$

$$V_{liq \to vap} = k_2 \times \sigma_2$$

In the above expressions, coefficients $k_1$, $k_2$ represent factors due to temperature and water repellency and attributable to properties of the reactant gas flow channel. The coefficients $k_1$, $k_2$ are to be mapped in advance from an experiment.

In step S6 illustrated in FIG. 8, a water transfer rate V_liq in the reactant gas flow channel is respectively calculated for the anode side and the cathode side from the following expression. Respective water transfer rates V_liq in the hydrogen flow channel 25A and the air flow channel 25B are calculated in consideration of the fact that liquid water is blown away and discharged from inside the cell plane by the flow of reactant gas in the reactant gas flow channel.

$$V\_liq = k_3 \times V\_gas$$

In this case, the water transfer rate V_liq refers to a transfer rate of liquid water blown away by the reactant gas. In addition, V_gas denotes a water vapor flow rate in the reactant gas flow channel. A value calculated from a map related to a state quantity such as a supply flow rate of reactant gas and water vapor partial pressure is to be used. The coefficient $k_3$ represents a factor due to temperature or water repellency and attributable to properties of the reactant gas flow channel. The coefficient $k_3$ is to be mapped in advance from an experiment.

FIG. 13 is a diagram illustrating an example of a residual water content distribution in a cell plane calculated in steps S4 to S6. The residual water content distribution is determined by taking into consideration the variation of liquid water in the reactant gas flow channel (in other words, $V_{vap \to liq}$, $V_{liq \to vap}$, and V_liq calculated in steps S5 and S6 described above) in addition to the relative humidity distribution (FIG. 12) in the reactant gas flow channel calculated in step S4. As can be understood from FIG. 13, in the hydrogen flow channel 25A, the residual water content is higher on the side of the hydrogen outlet 27b than the side of the hydrogen inlet 27a, and in the air flow channel 25B, the residual water content gradually drops toward the side of the air outlet 28b. Moreover, although not diagrammatically illustrated, a moisture content distribution in a cell plane can be determined from the relative humidity distribution (FIG. 12) of the electrolyte membrane 23 calculated in step S4 and is to approximate the relative humidity distribution.

From the procedure described above, variations (water balance) in a residual water content and a moisture content of a single cell $2_i$ in a given calculation time can be calculated and a residual water content distribution of the hydrogen flow channel 25A, a residual water content distribution of the air flow channel 25B, and a moisture content distribution of the electrolyte membrane 23 can be determined. Water balance in a cell plane can be calculated based on a coarseness of a mesh with sensitivity (for example, the five meshes illustrated in FIG. 13). Accordingly, how much residual water content and moisture content exist in which portion can be estimated with high accuracy.

2. Consideration of Temperature Variation and Flow Distribution Variation in Cell Lamination Direction During Estimation $T_{IN, i}$, $T_{OUT, i}$, $P_{air, i}$, $P_{H2, i}$, $Q_{air, i}$, and $Q_{H2, i}$ of each single cell $2_i$ are to be determined as follows.

(1) Calculation of Cell Inlet Temperature $T_{IN, i}$

As illustrated in FIG. 14, first, a stack inlet temperature $T_{in}$, a coolant flow rate $Q_{LLC}$, an external air temperature $T_{external\ air}$, and a vehicle speed $V_{vehicle\ speed}$ are read (step S11). In this case, $T_{in}$ is a detected value by the temperature sensor T1. $Q_{LLC}$ is a flow rate of the coolant to be supplied to the fuel cell 1 and can be estimated from the number of revolutions of the cooling pump 50 and other detected values. Alternatively, a flow rate sensor may be provided at the coolant flow channel 51 and a detected value by the flow rate sensor may be used. $T_{external\ air}$ is a detected value by the external air temperature sensor 62 and $V_{vehicle\ speed}$ is a detected value by the vehicle speed sensor 63.

Generally, in the cell laminate 3, the further away from the supply port 14 of the reactant gas or, in other words, the greater the cell channel "i," the greater the heat discharge. In addition, the influence of heat discharge varies depending on the coolant flow rate, the external air temperature, and the vehicle speed. For example, as illustrated in FIG. 15A, the greater the coolant flow rate $Q_{LLC}$ ($Q_1 > Q_2$), the less the stack inlet temperature $T_{IN}$ is influenced by heat discharge. In other words, the cell inlet temperature $T_{IN, i}$ can be prevented from dropping below the stack inlet temperature $T_{IN}$. In addition, as illustrated in FIG. 15B, the higher the $T_{external\ air}$ ($T_{external\ air\ 1} > T_{external\ air\ 1}$), the less the stack inlet temperature $T_{IN}$ is influenced by heat discharge.

Therefore, in consideration of such declines in coolant temperature due to heat discharge, the cell inlet temperature $T_{IN, i}$ is to be calculated as a function expressed as follows (step S12).

$$T_{IN, i} = f(Q_{LLC}, T_{IN}, T_{external\ air}, V_{vehicle\ speed})$$

Accordingly, a cell inlet temperature $T_{IN, i}$ corresponding to the cell channel i can be calculated from the respective values of $Q_{LLC}$, $T_{IN}$, $T_{external\ air}$, and vehicle speed described above.

(2) Calculation of Air Flow Rate $Q_{air, i}$ and Air Back Pressure $P_{air, i}$ As illustrated in FIG. 16, first, an air flow rate $Q_{air}$, an air back pressure $P_{air}$, a stack inlet temperature $T_{IN}$, a stack outlet temperature $T_{OUT}$, and a current value I are read (step S21). In this case, the air flow rate $Q_{air}$, the air back pressure $P_{air}$, and the stack outlet temperature $T_{OUT}$ are respective detected values of the flow rate sensor F1, the pressure sensor P1, and the temperature sensor T2. In addition, in step S21, a gas density of air that flows into the manifold 15a is calculated as a function of the stack inlet temperature $T_{IN}$ and the air flow rate $Q_{air}$.

In the following step S22, a P-Q characteristic (a characteristic representing a relationship between air back pressure and air flow rate) of a single cell $2_i$ is determined based on the residual water content of the single cell $2_i$. For example, a map representing a P-Q characteristic (pressure-flow rate characteristic) corresponding to a plurality of residual water contents (x>y) such as that illustrated in FIG. 17 is to be acquired in advance, and a P-Q characteristic corresponding to an immediately previous residual water content (a total amount of the cathode-side residual water content of the single cell $2_i$) calculated by the flow illustrated in FIG. 8 is determined.

Next, a cell inlet pressure distribution, a cell inflow flow rate distribution, and a cell outlet pressure distribution are calculated from a map as functions of the air flow rate $Q_{air}$, the air back pressure $P_{air}$, the stack outlet temperature $T_{OUT}$, the gas density calculated above, and the P-Q characteristic of each single cell $2_i$ (step S23). An example of the distributions are as illustrated in FIGS. 18A to 18C. In this case, since the cell inflow flow rate illustrated in FIG. 18B and the cell outlet pressure illustrated in FIG. 18C correspond to an air flow rate $Q_{air, i}$ and an air back pressure $P_{air, i}$ of the cell channel i, respective values thereof can be determined (step S24).

Moreover, although a detailed description will not be given, a hydrogen flow rate $Q_{H2, i}$ and a hydrogen pressure $P_{H2, i}$ of the single cell $2_i$ can also be calculated by the same method as used for the calculations of the air flow rate $Q_{air, i}$ and the air back pressure $P_{air, i}$. In this case, since the cell inlet pressure illustrated in FIG. 18A corresponds to the hydrogen pressure $P_{H2, i}$ and the cell inflow flow rate illustrated in FIG. 18B corresponds to the hydrogen flow rate $Q_{H2, i}$, respective values thereof can be determined.

(3) Calculation of Cell Outlet Temperature $T_{OUT, i}$

As illustrated in FIG. 19, first, a stack outlet temperature $T_{OUT}$ is read as a detected value of the temperature sensor T2 (step S31). In addition, a coolant flow rate $Q_{LLC}$, an external air temperature $T_{external\ air}$, and a vehicle speed $V_{vehicle\ speed}$ are read in the same manner as in the case of the stack inlet temperature $T_{IN}$ described above. Furthermore, a cell voltage $V_i$ and a current value I are read, and a heat generation amount $Q_{cell, i}$ cell, of each single cell $2_i$ is estimated from an I-V characteristic of each single cell $2_i$.

In this case, a voltage value of each single cell $2_i$ detected by a cell monitor, not illustrated, can be used as the cell voltage $V_i$. However, instead of using a sensor such as a cell monitor, the cell voltage $V_i$ can also be estimated by having each single cell $2_i$ retain an I-V map (dependent on an electric-generating capacity, an air flow rate, a hydrogen flow rate, an air back pressure, and a hydrogen pressure). Moreover, the heat generation amount $Q_{cell, i}$ is attributable to heat generation by TΔS and heat loss due to overvoltage.

In the same manner as the stack inlet temperature $T_{IN}$ described above, the stack outlet temperature $T_{OUT}$ is also influenced by heat discharge depending on the position of the single cell $2_i$ in the cell laminate 3. For example, as illustrated in FIG. 20, the greater the coolant flow rate $Q_{LLC}$ ($Q_{LLC1} < Q_{LLC2}$), the less the stack outlet temperature $T_{OUT}$ is influenced by heat discharge.

Therefore, the coolant flow rate $Q_{LLC, i}$ and heat discharge are taken into consideration in addition to the heat generation amount $Q_{cell, i}$, cell, and the cell outlet temperature $T_{OUT, i}$ is to be calculated as a function expressed as follows (step S32).

$$T_{OUT, i} = f(Q_{cell, i}, Q_{LLC, i}, T_{OUT}, T_{external\ air}, V_{vehicle\ speed})$$

Accordingly, a cell outlet temperature $T_{OUT, i}$ corresponding to the cell channel i can be calculated from respective detected values or estimated values represented by the parameters.

Moreover, $Q_{LLC, i}$ is a coolant flow rate to be supplied to each single cell 2 and takes into consideration a flow distribution variation with respect to the coolant flow rate $Q_{LLC}$ described earlier in a case where a single fuel cell stack 1 is assumed. More specifically, by creating in advance a map representing a relationship between the coolant flow rate $Q_{LLC}$ and the cell channel i for each of several coolant flow rates $Q_{LLC}$, a $Q_{LLC, i}$ corresponding to the cell channel i can be calculated.

According to the procedures (1) to (3) described above, values that take into consideration a temperature distribution (a variation in heat discharge or the like) and pressure drop distribution (flow distribution variations of oxidation gas, fuel gas, coolant, or the like) can be used for state quantities of each single cell $2_i$ in the flows (steps S1, S2, and S4) illustrated in FIG. 8. Accordingly, compared to a case where the fuel cell 1 is singularly perceived as a stack, a residual water content distribution and a moisture content distribution can be estimated with high accuracy for all single cells 2 (in other words, in a cell lamination direction).

D. Control Example Using Estimation Results

Next, a control example using estimation results according to the above estimating method will be described. The present control example uses accurate estimation results to perform an optimum current limiting in consideration of a water distribution in the fuel cell 1, so that fuel consumption can be improved and degradation due to cell voltage drop can be suppressed.

FIG. 21 is a flow chart showing optimization of current limiting through water distribution estimation. First, in step S101, respective residual water content distributions of the hydrogen flow channels 25A and the air flow channels 25B as well as a moisture content distribution of all single cells 2 are estimated according to the above estimating method. The estimation is performed by the estimating unit 67. It is then determined whether or not the estimated residual water content is equal to or above the threshold (step S102). The determination is made by the operation control unit 68.

If the estimated residual water content is less than the threshold (step S102: NO), the operation control unit 68 does not limit an electric current drawn from the fuel cell 1 (step S103). This is because when the residual water content is less than the threshold, an output current may be drawn from the fuel cell 1 according to a requested output without cell voltage drop. On the other hand, if the estimated residual water content is equal to or above the threshold (step S102: YES), the operation control unit 68 goes through a current limiting value determination logic (step S104) and limits an electric current drawn from the fuel cell 1 (step S105).

Here, the residual water content (estimated value) to be compared to the threshold in step S102 is the residual water content from any part of the hydrogen flow channels 25A and the air flow channels 25B. Then the threshold used in the comparison varies between on the hydrogen flow channel 25A side and on the air flow channel 25B side, and also varies depending on the location of a single cell 2 in the cell lamination direction. This is because how liquid water removed with the reactant gas can be discharged is dependent on the type of reactant gas (hydrogen gas and air), the location in the cell lamination direction, and the location in the cell plane. In this respect, specific description will be made with reference to FIGS. 22 to 24.

As shown in FIG. 22, in a single cell 2 located on the far side in the cell lamination direction (end cell 2a), reactant gas is more difficult to flow due to pressure drop and the like in the manifold 15a. In other words, the nearer a single cell 2 is located on the near side in the cell lamination direction, the easier reactant gas flows from a gas inlet (27a, 28a) to a gas outlet (28a, 28b), and liquid water can more easily be discharged. Note that the terms "far side" and "near side" in the cell lamination direction refer to the downstream side and the upstream side, respectively, in the direction of reactant gas supply in the cell laminate 3. Further, in the cell plane, liquid water is more difficult to be discharged on the gas inlet (27a, 28a) side because of a longer distance up to the gas outlet (27b, 28b). This means that, in the cell plane, the nearer to a gas outlet (28a, 28b) accumulated liquid water is located, the easier the water can be discharged to the outside of the reactant gas flow channel (25A, 25B). Note that, in FIG. 22, a flow channel form of a counter flow type is taken as an example in order to show hydrogen gas and air flows with respect to the cell plane location.

FIGS. 23A and 23B show a relation between a threshold used for a single cell 2 located on the farthest side in the cell lamination direction and a location in the hydrogen flow channel 25A and between the threshold and a location in the air flow channel 25B, respectively. An arrow on the axis of abscissas shown in these figures represents the hydrogen gas and air flow direction in the cell plane, and these flow directions correspond to the flow directions shown in FIG. 22. Therefore, in FIG. 23A for example, the intersection of the axes of ordinates and abscissas represents the hydrogen outlet 27b, and a larger threshold is used at a location nearer to the hydrogen outlet 27b. Similarly, in FIG. 23B, the intersection of the axes of ordinates and abscissas represents the air inlet 28a, and a larger threshold is used at a location nearer to the air inlet 28a. As can be seen, a threshold is larger at a location nearer to the gas outlet (27b, 28b) because accumulated water is easier to be discharged, as described above.

FIGS. 24A and 24B show a relation between a threshold used for a single cell 2 located on the nearest side in the cell lamination direction and a location in the hydrogen flow channel 25A and between the threshold and a location in the air flow channel 25B, respectively. Similarly to FIG. 23A, in FIG. 24A, the intersection of the axes of ordinates and abscissas represents the hydrogen outlet 27b, and a larger threshold is used at a location nearer to the hydrogen outlet 27b. In this respect, the same applies to FIG. 24B. As can be seen by comparing FIG. 23A with FIG. 24A, when the location is the same in the cell plane, a larger threshold is used on the near side than on the far side in the cell lamination direction. For example, thresholds in the vicinity of the hydrogen outlet 27b show a relation of $g_{A,1} < g_{A,2}$. The reason is that accumulated water is easier to be discharged on the near side in the cell lamination direction, as described above.

In this way, a threshold used in step S102 is not a constant value but a predetermined value depending on the location where liquid water is present in consideration of drainage ability. If it is confirmed that liquid water is accumulated in an amount equal to or above the threshold in at least one single cell 2 in the fuel cell 1 (step S102: YES), the level of current limiting for the fuel cell 1 is determined (step S104) in order to suppress degradation of the single cell 2. At this time, the operation control unit 68 preferably changes the level of current limiting depending on at least one of the location where a residual water content is equal to or greater than the threshold and the level thereof.

In particular, as the location where a residual water content is equal to or greater than the threshold is located where liquid water can less easily be discharged, the current limiting value for the fuel cell 1 is decreased (step S104). Therefore, as the location is on the far side in the cell lamination direction or located nearer to the gas inlet (27a, 28a), a setting is made such that the maximum value of an electric current drawn from the fuel cell 1 is decreased to draw a less current (step S104). Cell voltage drop may thereby be suppressed when power is generated in the fuel cell 1 with current limiting performed in step S105.

On the other hand, as the location where a residual water content is equal to or greater than the threshold is located where liquid water can more easily be discharged, the current limiting value for the fuel cell 1 is increased (step S104). Therefore, as the location is on the near side in the cell lamination direction or located nearer to the gas outlet (27b, 28b), a setting is made such that the maximum value of an electric current drawn from the fuel cell 1 is increased such that power can be generated as much as possible in the fuel cell 1 (step S104). A large amount of power generation can thereby be assured by as much as the increase of current limiting value when power is generated in the fuel cell 1 with current limiting performed in step S105.

Further, the current limiting value for the fuel cell 1 is decreased as a residual water content equal to or greater than the threshold increases, and the current limiting value for the fuel cell 1 is increased as a residual water content equal to or greater than the threshold decreases (step S104). If a small current limiting value is constantly used regardless of the level of residual water content, a large enough amount of power generation for the fuel cell 1 can not be assured. Similarly, if a large current limiting value is constantly used, a likelihood of cell voltage drop may increase. Therefore, by changing the current limiting value depending on the level of residual water content as described above, a large amount of power generation can be assured and cell voltage drop can be suppressed.

FIG. 25 shows a relation between time and a current limiting value with respect to optimization of current limiting. For example, time $t_1$ represents a time when the fuel cell 1 starts generating power at the startup of the fuel cell system 100, and time $t_2$ represents a time when acceleration (rapid power ramp) of the fuel cell vehicle is allowed. A dotted line $M_1$ shows an example in which the current limiting value between time $t_1$ and time $t_2$ is set to $I_1$ and the current limiting value is set to $I_2$ in a stepwise manner at time $t_2$. Note that the current limiting value $I_1$ is set in step S104 described above. According to the example, the fuel cell 1 can generate power under a suitable current limiting value depending on the location and the level of residual water content.

A curve $M_2$ in FIG. 25 shows a more preferred example of the embodiment. In this example, after the current limiting value at time $t_1$ when power generation is started is set to $I_1$ in step S104, the current limiting value is progressively increased over time and the current limiting value is set to $I_2$ at time $t_2$. According to the example, since the current limiting value is progressively increased, a large amount of power generation for the fuel cell 1 can be assured by as much as the increase of current limiting value (an area delimited by the curve $M_2$ and the dotted line $M_1$ in FIG. 25). According to the example, therefore, the efficiency can be improved and when the accelerator pedal is pressed (acceleration request), it can be responded.

As described above, since the control example according to the embodiment uses an accurate estimation result on a water distribution, current limiting can be accurately performed. In particular, since the level of current limiting is changed depending on the location and amount of liquid water, current limiting can be optimized. Therefore, degradation of a catalyst in the electrodes 24A and 24B due to cell voltage drop can be suppressed, while a large amount of power generation for the fuel cell 1 can be assured and fuel consumption can be improved.

Additionally, since the current limiting value is changed according to the curve $M_2$ shown in FIG. 25, a strange feeling for a user of a fuel cell vehicle due to a lag of acceleration can be mitigated. Specifically, since current limiting is not performed when liquid water is not accumulated at the startup of the vehicle (fuel cell system 100), the user can feel acceleration of the vehicle even at the startup. However, if liquid water is accumulated and constant current limiting is performed, the user pressing the accelerator pedal will feel strangeness of the vehicle that does not accelerate at that time. In this respect, by performing current limiting according to the curve $M_2$, a large amount of power generation for the fuel cell 1 can be assured. In this way, the user can feel acceleration even at the startup and drivability can be improved. In addition, the power of a battery which is not shown (secondary battery) can be saved.

Note that current limiting through water distribution estimation described above is preferably be performed at the startup of the fuel cell system 100. This is because during a time other than the startup, such as while the fuel cell system 100 is operated, cell voltage drop and the like due to the excessive residual water content can be suppressed by implementing a countermeasure control based on water distribution estimation (for example, a control with which liquid water is reduced by varying a state quantity of reactant gas).

In the above example, the current limiting value is progressively increased over time (time $t_1$ to time $t_2$); however, when a residual water content equal to or greater than the threshold does not decrease or does increase over time, it is preferable to decrease the current limiting value. That is, the estimated residual water content, which should change over time, does not decrease and is still relatively large after a certain amount of time (for example, at time $t_2$), or does increase conversely, the current limiting value may be decreased. In this way, degradation of the fuel cell 1 due to cell voltage drop can be suppressed. On the other hand, the estimated residual water content after a certain amount of time (for example, at time $t_2$) is relatively small, the current limiting value may be increased. Note that the time passage can be measured by a timer or the like which is not shown.

Next, with reference to FIGS. 26 and 27, description will be made to optimization of scavenging according to control based on water distribution estimation. Similarly to step S101 in FIG. 21, in step S111 in FIG. 26, a residual water content distribution and a moisture content distribution are estimated according to the above estimating method for each of the hydrogen flow channels 25A and the air flow channels 25B in all of the single cells 2. Similarly to step S102 in FIG. 21, then, it is determined whether or not the estimated residual water content is equal to or above the threshold (step S112).

If the estimated residual water content is less than the threshold (step S112: NO), power generation is started without scavenging process on the fuel cell 1 (step S117). On the other hand, if the estimated residual water content is equal to or above the threshold (step S112: YES), scavenging process on the fuel cell 1 is implemented (step S113). This scavenging process is implemented by supplying air through the compressor 33 while supply of hydrogen gas to the fuel cell 1 is suspended to remove moisture in the fuel cell 1 by means of air. Note that scavenging process is not limited to the above method and, for example, inert gas (e.g. nitrogen) may be supplied to the reactant gas flow channel in the fuel cell 1.

After scavenging process, a residual water content distribution and a moisture content distribution are again estimated according to the above estimating method (step S114). Subsequently, the operation control unit 68 uses a current limiting value determination logic to determine a current limiting value for the fuel cell 1 (step S115). The determination of the current limiting value can be accomplished through the same approach as in step S104 described above. That is, a current limiting value $I_3$ is determined depending on the location and the level of liquid water.

In step S116, then, it is determined whether or not the determined current limiting value $I_3$ is equal to or above the threshold. For example, the threshold is set to a value at which predetermined current draw may be allowed from the fuel cell 1. As a result, if the current limiting value $I_3$ does not exceed the threshold (step S116: NO), that is, output current draw can not be allowed, another scavenging process is implemented on the fuel cell 1 to decrease the amount of moisture in the cell (step S113). On the other hand, if the current limiting value $I_3$ is equal to or above the threshold (step S116: NO), that is, output current draw can be allowed, power generation is started for the fuel cell 1 (step S117). Thereafter, the process flow for optimization of current limiting as shown in FIG. 21 is implemented.

FIG. 27 shows a relation between time and a current limiting value with scavenging process implemented before current limiting. FIG. 27 is different from FIG. 25 in that a curve $M_3$ is added between time $t_0$ to time $t_1$ when power generation is started. At time $t_0$, steps S111 and S112 shown in FIG. 26 are processed. Steps S113 to S116 (YES) are processed between time $t_0$ to time $t_1$. As indicated by the curve $M_3$, a current limiting value determined in step S115 is progressively increased.

In this way, a residual water content can be reduced by scavenging processes implemented as necessary. Therefore, it is not necessary to decrease the current limiting value for the fuel cell 1 after power generation is started, and time needed for current limiting can be reduced.

BRIEF DESCRIPTION OF THE DRAWINGS

FIG. 14 is a flow chart showing a method for calculating the cell inlet temperature according to the embodiment;

FIG. 15A shows an effect of heat radiation on the stack inlet temperature as a relation between the location of a single cell and coolant flow rate, according to the embodiment;

FIG. 15B shows an effect of heat radiation on the stack inlet temperature as a relation between the location of a single cell and ambient temperature, according to the embodiment;

FIG. 16 is a flow chart showing a method for calculating air flow rate and air back pressure of each single cell according to the embodiment;

FIG. 17 is a map showing P-Q characteristics of a single cell depending on a residual water content according to the embodiment;

DESCRIPTION OF SYMBOLS

Figure 1:
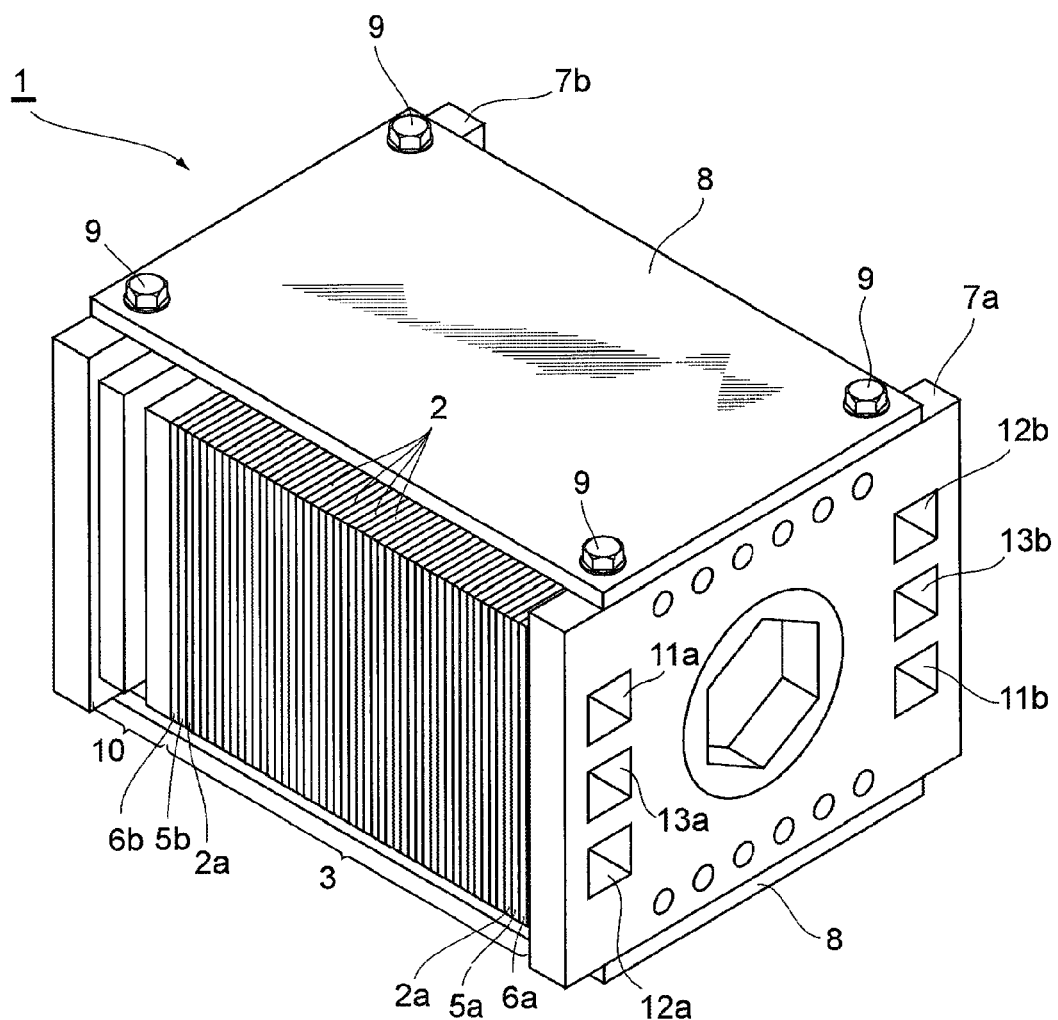
FIG. 1 is a perspective view of a fuel cell according to an embodiment.
Figure 2:
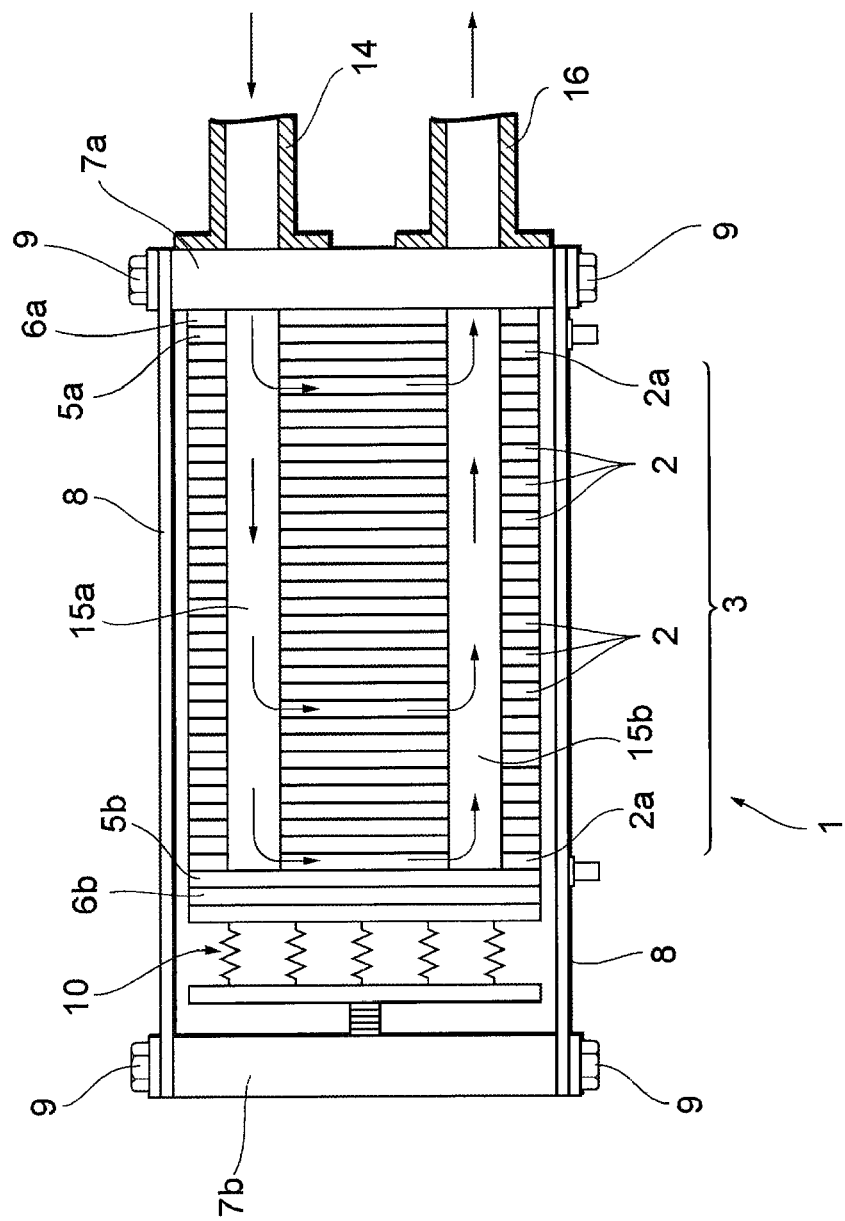
FIG. 2 is a side view showing a part of the inside of the fuel cell according to the embodiment.
Figure 3:
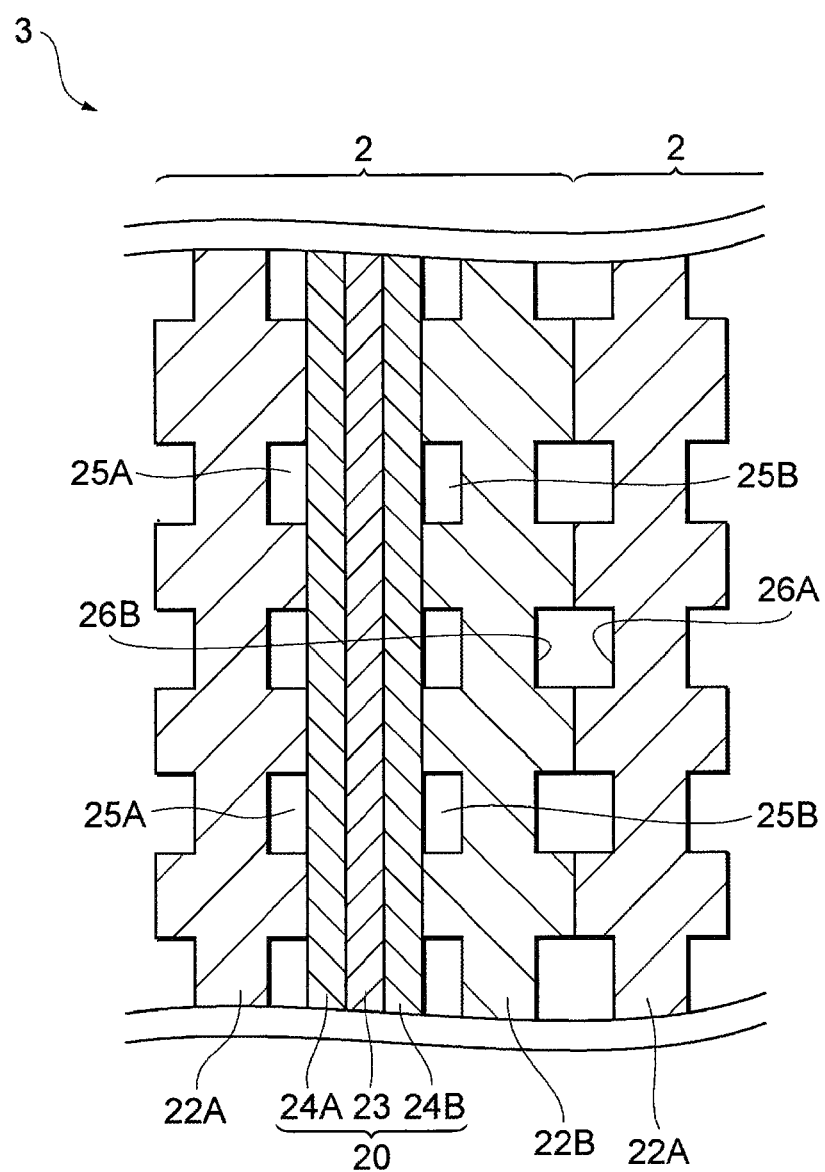
FIG. 3 is a sectional view of a single cell according to the embodiment.
Figure 4:
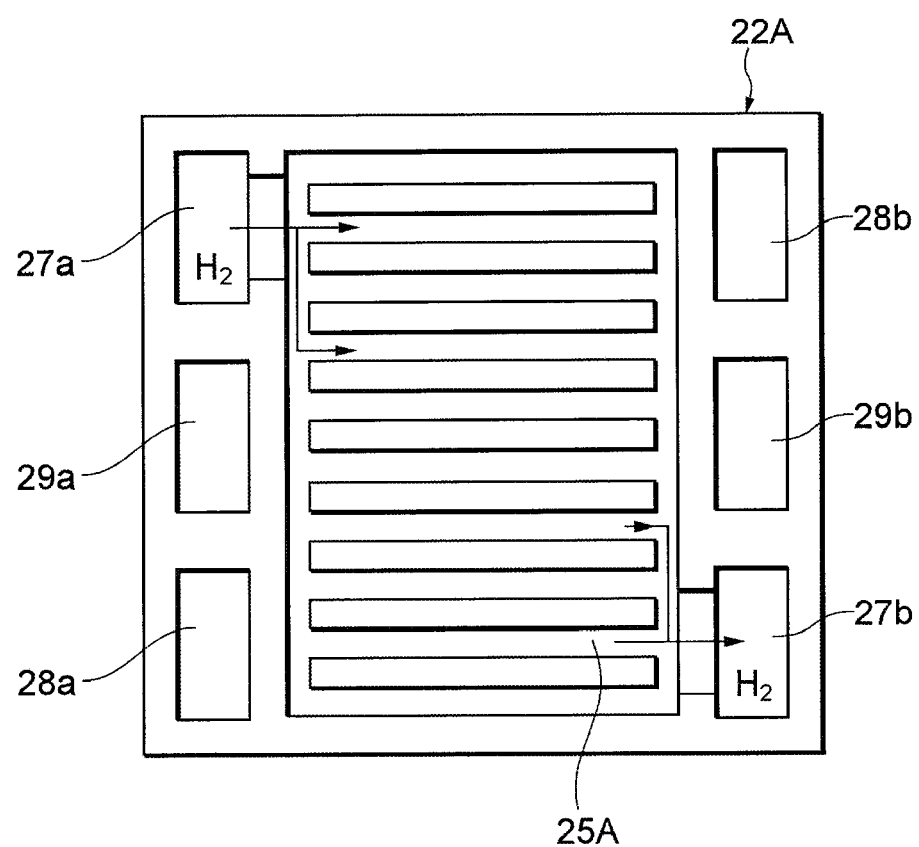
FIG. 4 is a plan view of a separator according to the embodiment.
Figure 5A:
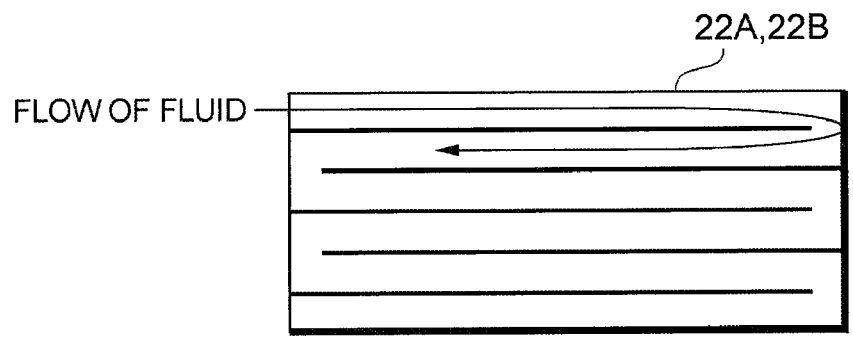
FIG. 5A is a schematic plan view showing a flow channel geometry of a separator according to a first variant of the embodiment.
Figure 5B:
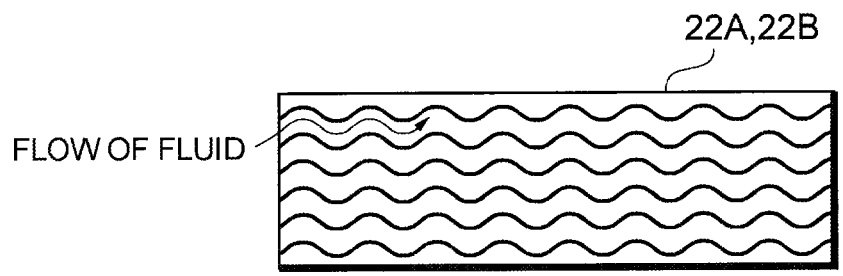
FIG. 5B is a schematic plan view showing a flow channel geometry of a separator according to a second variant of the embodiment.
Figure 5C:
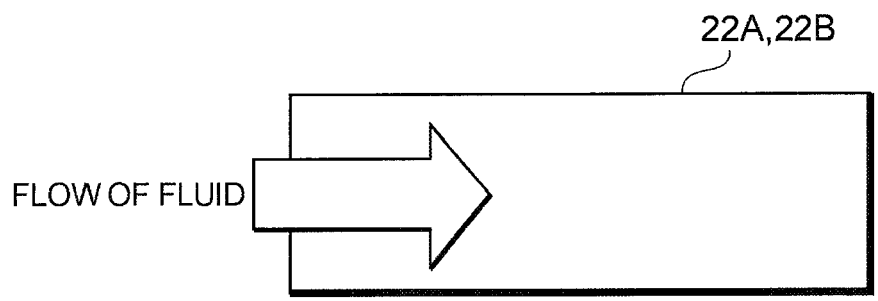
FIG. 5C is a schematic plan view showing a flow channel geometry of a separator according to a third variant of the embodiment.
Figure 6:
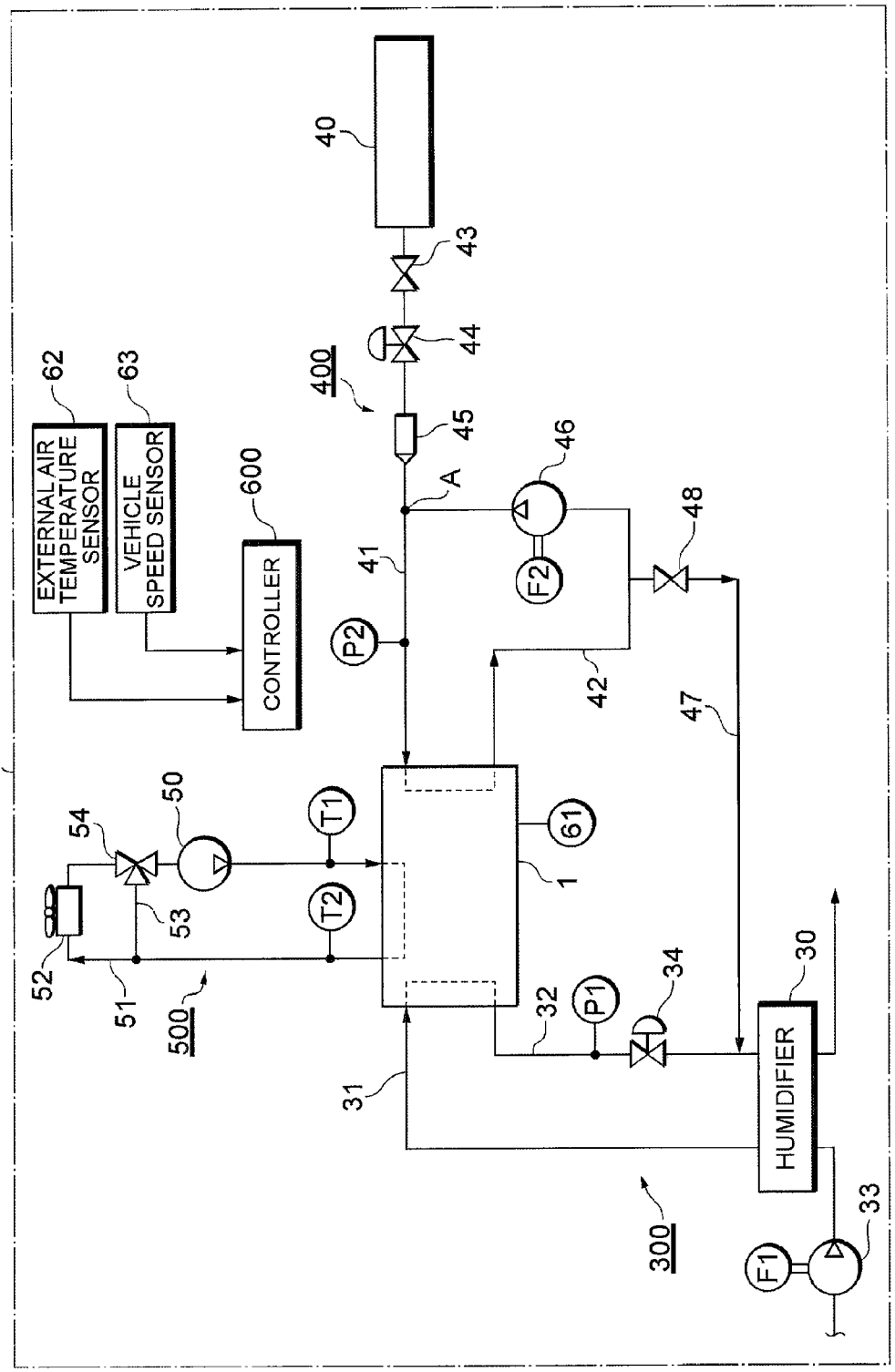
FIG. 6 is a diagram of a fuel cell system according to the embodiment.
Figure 7:
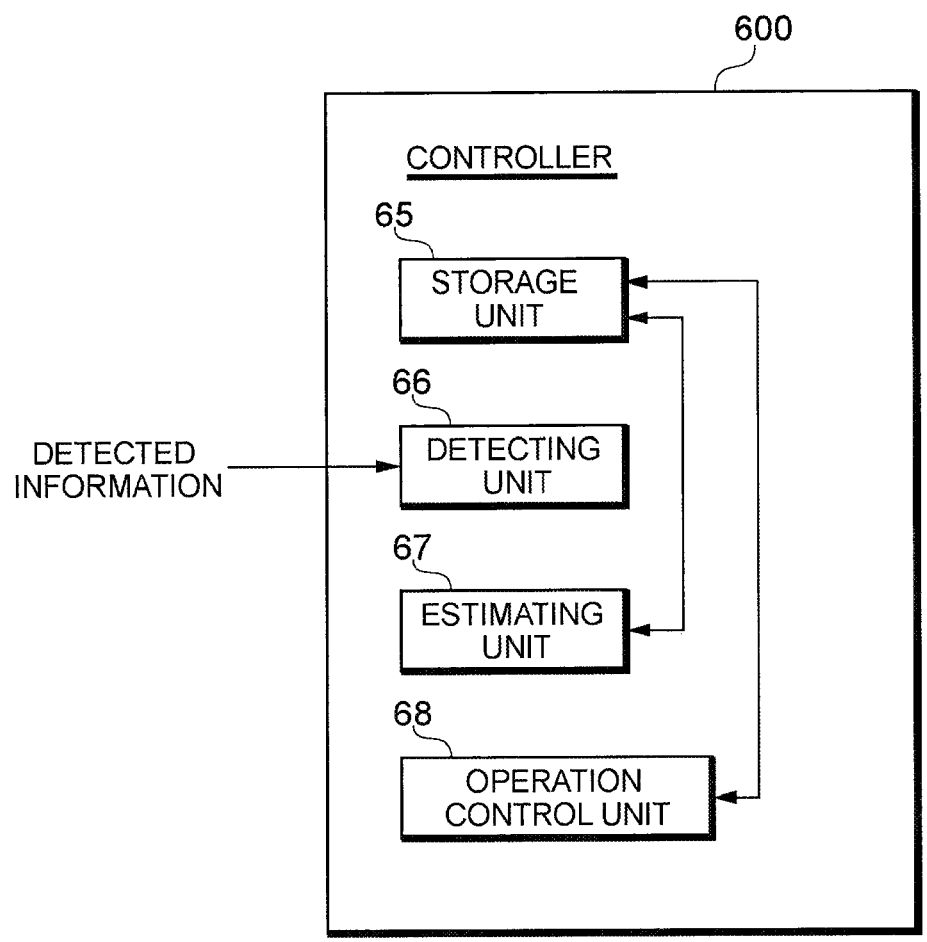
FIG. 7 is a functional block diagram of a controller according to the embodiment.
Figure 8:
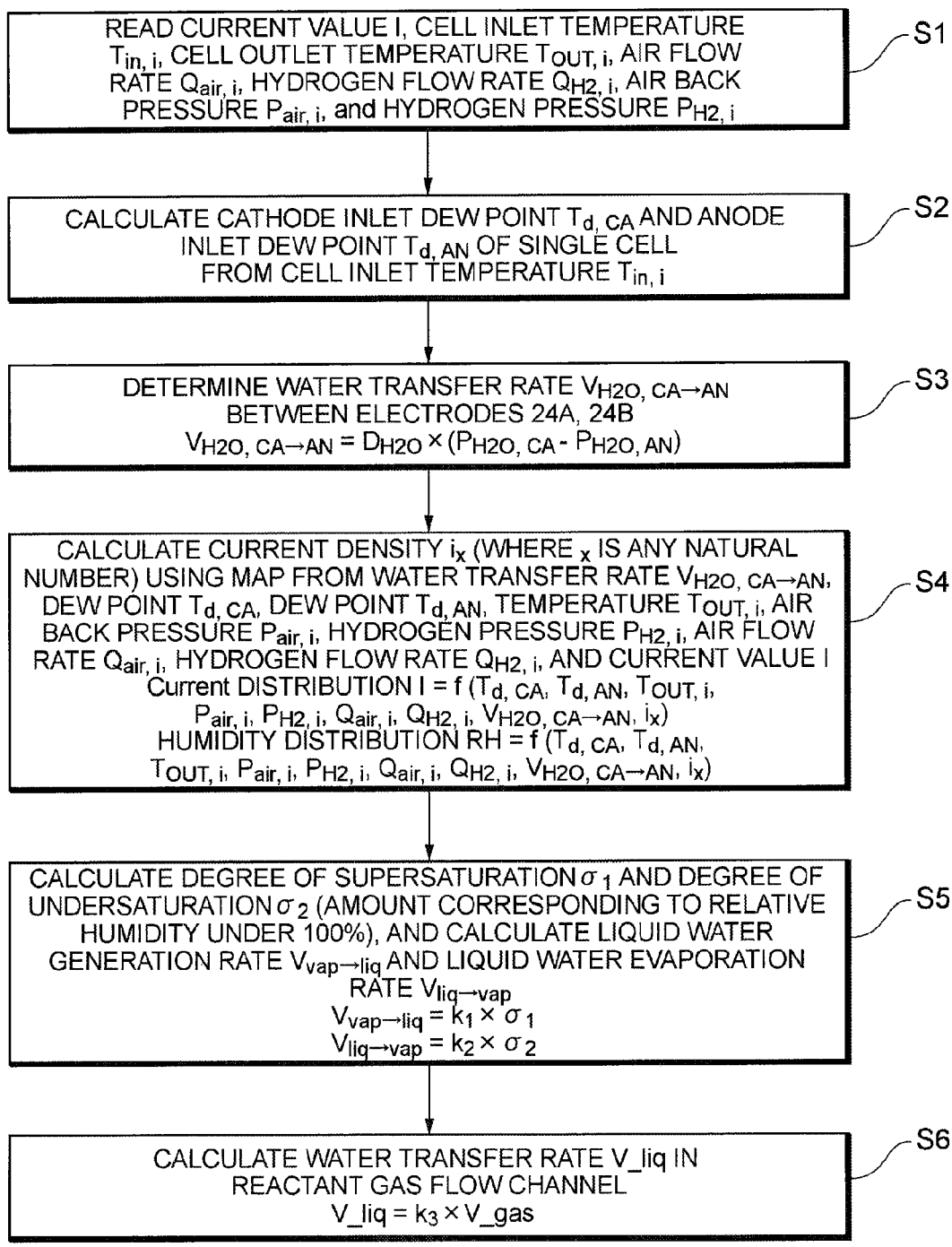
FIG. 8 is a flow chart showing a method for estimating a water distribution in a cell plane according to the embodiment.
Figure 9:
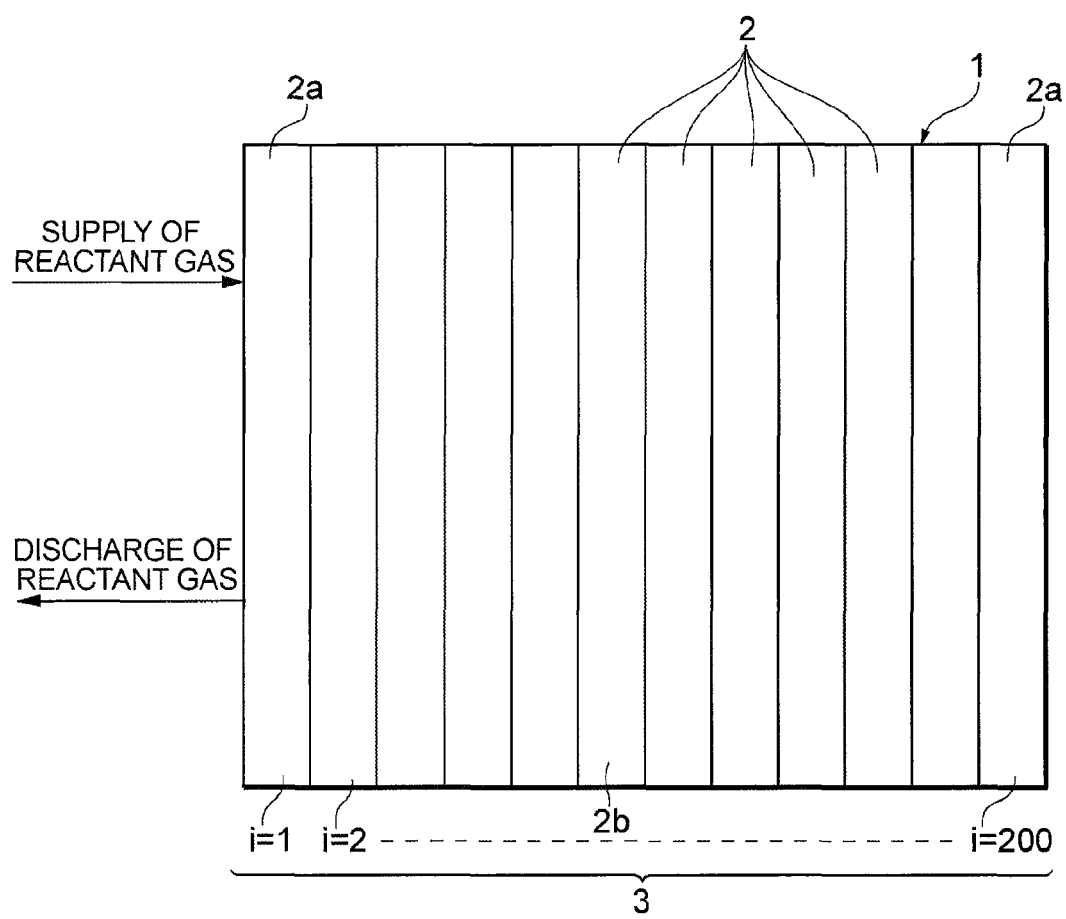
FIG. 9 shows a relation between supply/discharge of reactant gas and cell flow channels for a cell laminate according to the embodiment.
Figure 10:
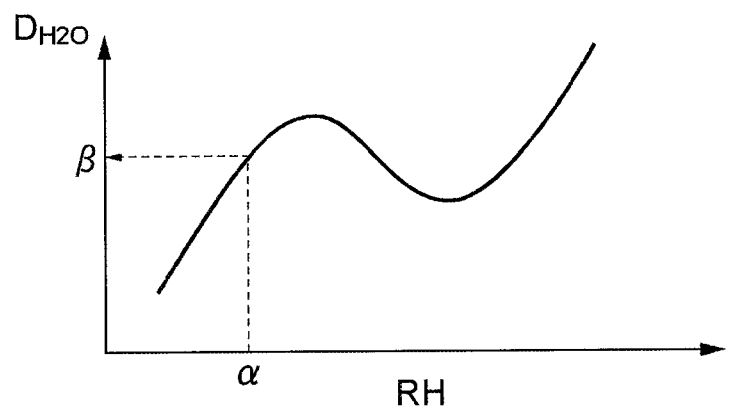
FIG. 10 is a characteristics map representing a relation between relative humidity and $D_{H2O}$ of an electrolyte membrane according to the embodiment.
Figure 11:
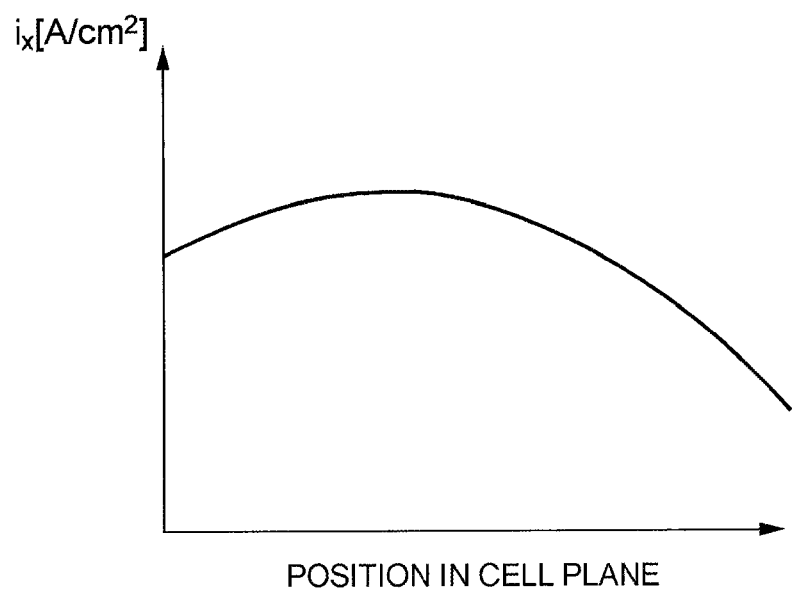
FIG. 11 shows current density with respect to the location in the cell plane according to the embodiment.
Figure 12:
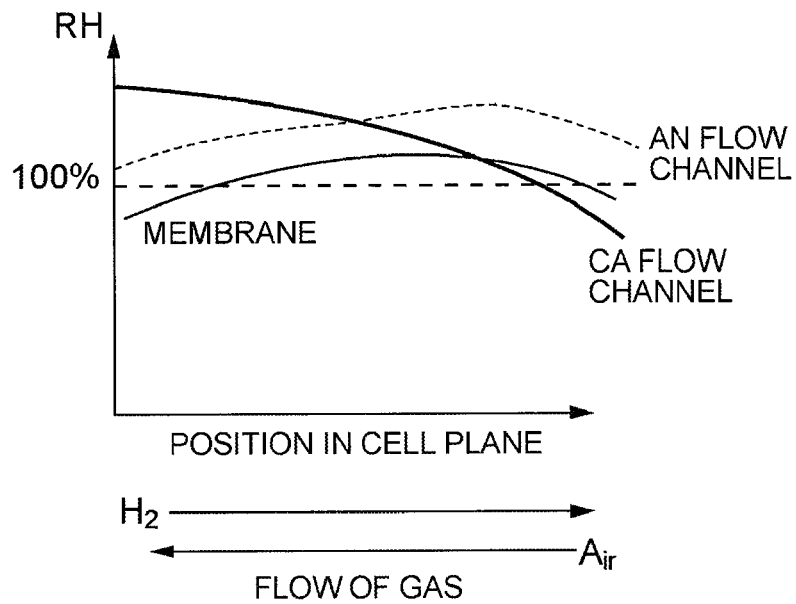
FIG. 12 shows relative humidity distributions of reactant gas flow channels in the cell plane and electrolyte membrane according to the embodiment.
Figure 13:
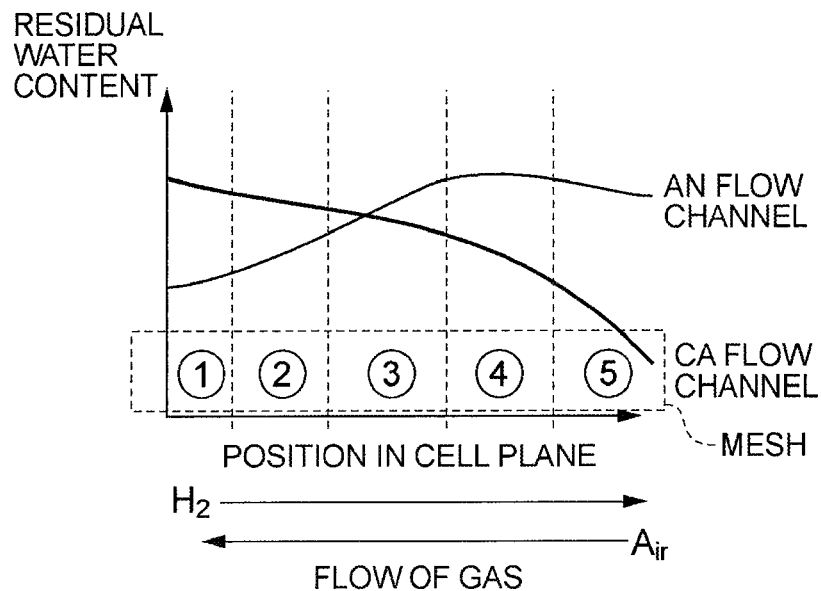
FIG. 13 shows a residual water content distribution in the cell plane according to the embodiment.
Figure 18A:
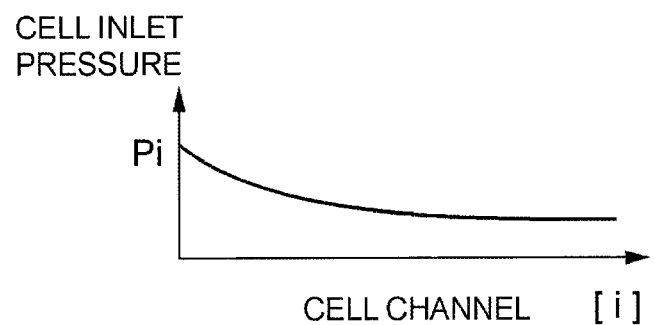
FIG. 18A shows the cell inlet pressure distribution according to the embodiment.
Figure 18B:
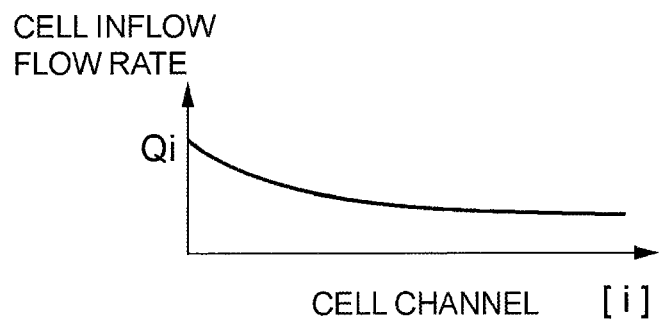
FIG. 18B shows the cell inflow rate distribution according to the embodiment.
Figure 18C:
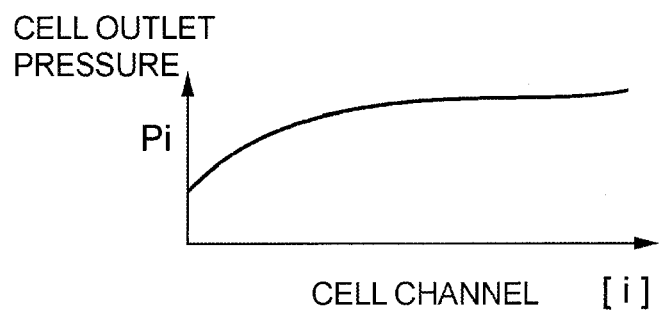
FIG. 18C shows the cell outlet pressure distribution according to the embodiment.
Figure 19:
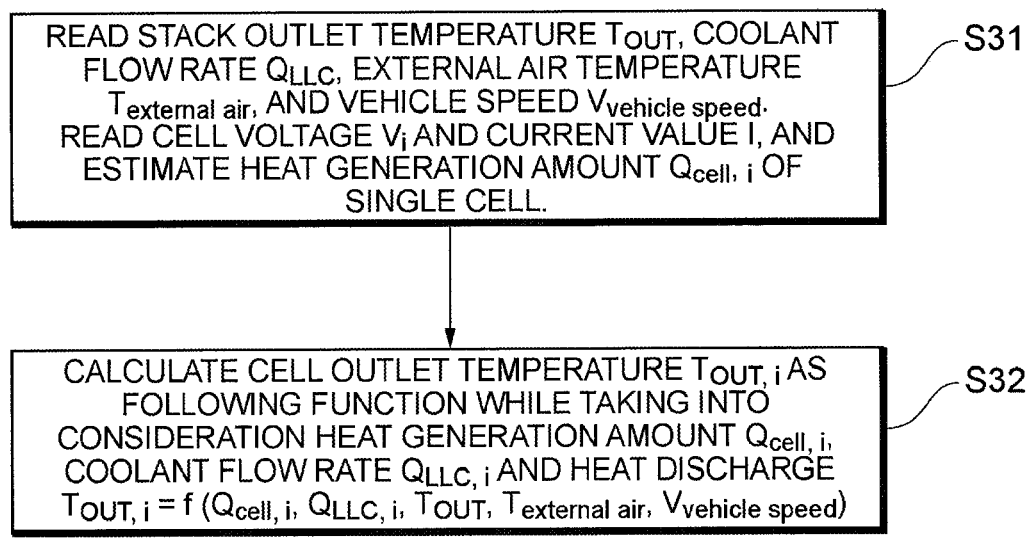
FIG. 19 is a flow chart showing a method for calculating the cell outlet temperature according to the embodiment.
Figure 20:
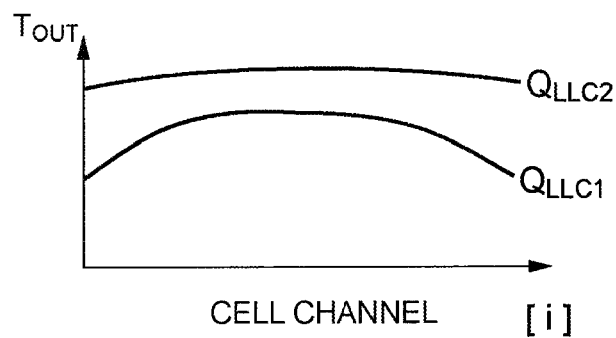
FIG. 20 shows an effect of heat radiation on the stack outlet temperature as a relation between the location of a single cell and coolant flow rate, according to the embodiment.
Figure 21:
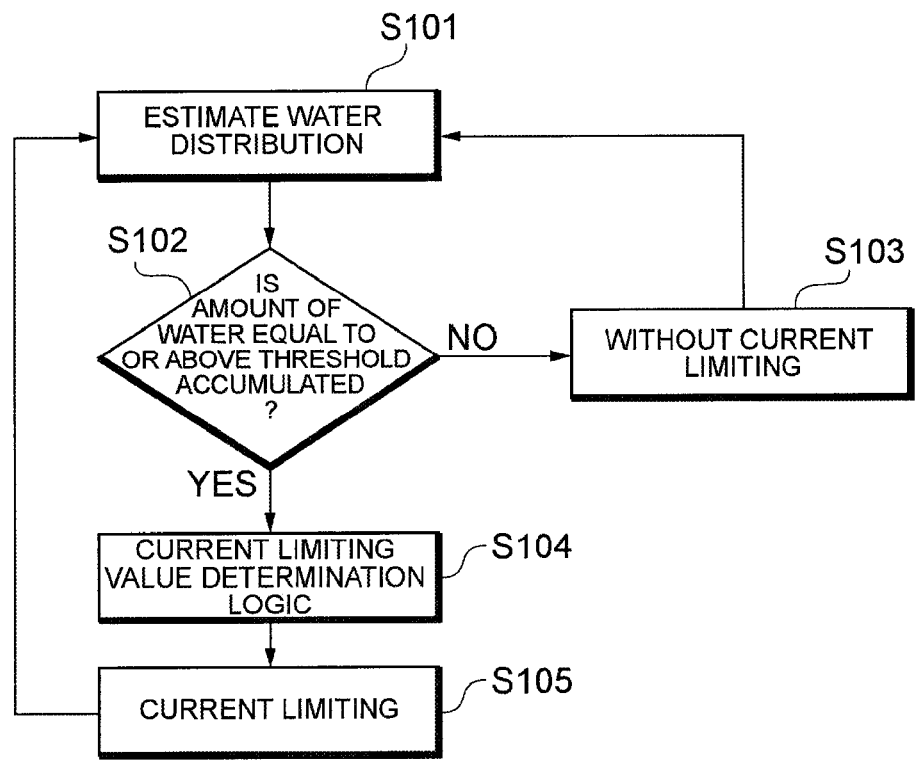
FIG. 21 is a flow chart showing optimization of current limiting through water distribution estimation according to the embodiment.
Figure 22:
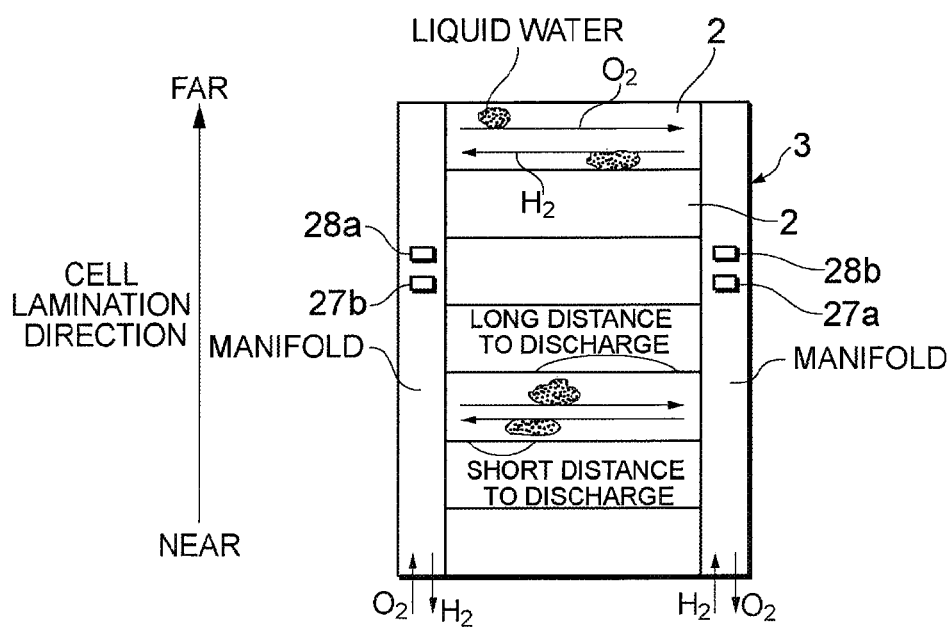
FIG. 22 schematically shows flow of reactant gas and liquid water in the cell laminate according to the embodiment.
Figure 23A:
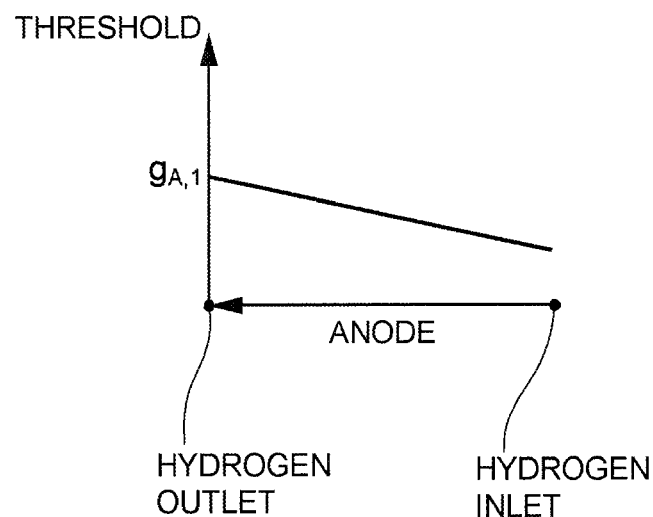
FIG. 23A shows a relation between a threshold used for optimization of current limiting according to the embodiment and a location in the oxidation gas flow channel on the far side in the cell lamination direction.
Figure 23B:
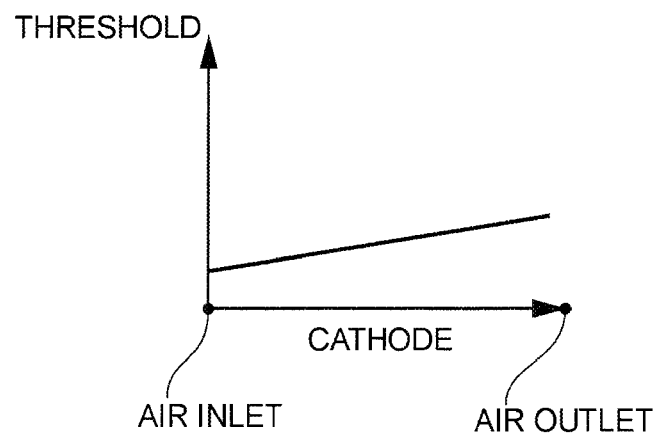
FIG. 23B shows a relation between a threshold used for optimization of current limiting according to the embodiment and a location in the fuel gas flow channel on the far side in the cell lamination direction.
Figure 24A:
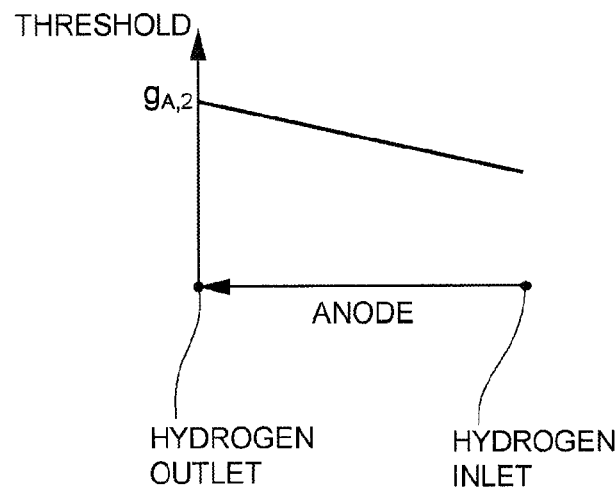
FIG. 24A shows a relation between a threshold used for optimization of current limiting according to the embodiment and a location in the oxidation gas flow channel on the near side in the cell lamination direction.
Figure 24B:
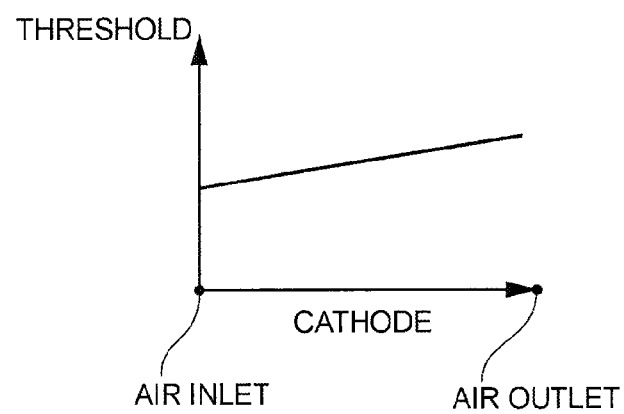
FIG. 24B shows a relation between a threshold used for optimization of current limiting according to the embodiment and a location in the fuel gas flow channel on the near side in the cell lamination direction.
Figure 25:
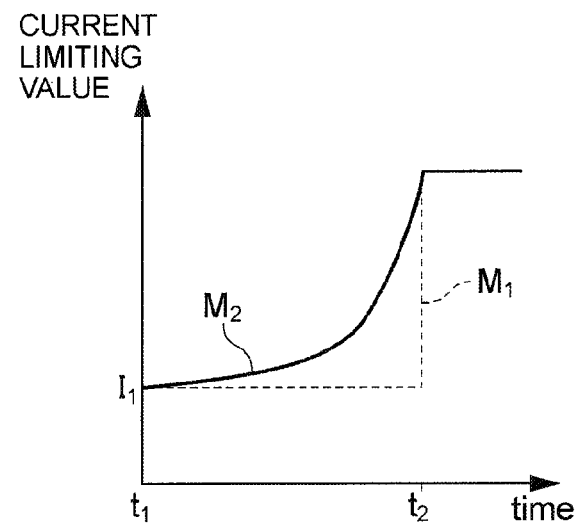
FIG. 25 shows a relation between time and a current limiting value with respect to optimization of current limiting according to the embodiment.
Figure 26:
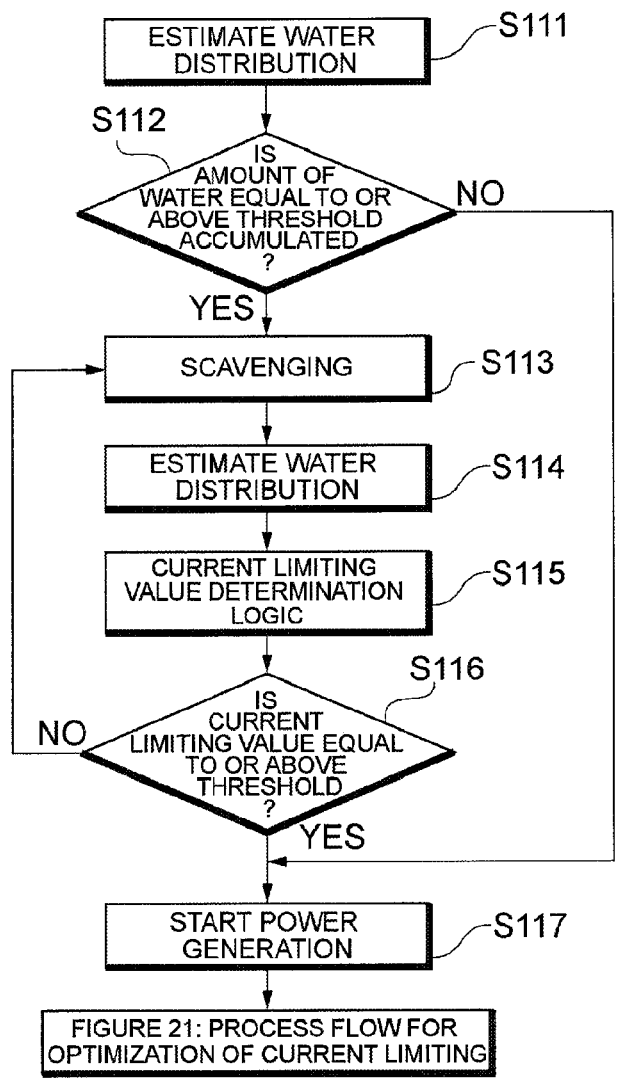
FIG. 26 is a flow chart showing optimization of scavenging according to control based on water distribution estimation according to a variant of the embodiment.
Figure 27:
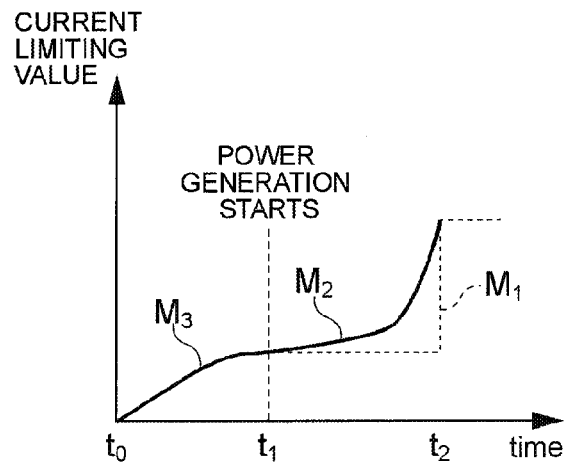
FIG. 27 shows a relation between time and a current limiting value with respect to optimization of current limiting according to a variant of the embodiment.

1: fuel cell
2: single cell
2a: primary cell
2b: end cell
23: electrolyte membrane
24A: anode electrode
24B: cathode electrode
25A: hydrogen flow channel (fuel gas flow channel)
25B: air flow channel (oxidation gas flow channel)
67: estimating unit
68: operation control unit
100: fuel cell system
300: air piping system
400: hydrogen piping system
500: coolant piping system
600: controller

The invention claimed is:

1. A fuel cell system comprising a fuel cell having a cell laminate formed by laminating a plurality of single cells, each of the single cells having an anode electrode, a cathode electrode, and an electrolyte membrane existing between the anode electrode and the cathode electrode, and a reactant gas flow channel, the fuel cell system comprising:

an estimating unit programmed to estimate a residual water content distribution in the reactant gas flow channel in a cell plane of each single cell while taking into consideration water transfer that occurs between the anode electrode and the cathode electrode via the electrolyte membrane; and an operation control unit programmed to limit an electric current drawn from the fuel cell when the residual water content in the reactant gas flow channel estimated by the estimating unit is equal to or greater than a predetermined threshold, wherein the cell laminate is configured so that reactant gas is supplied to the reactant gas flow channel of each single cell in the cell lamination direction, wherein the operation control unit is programmed to decrease a current limiting value for the fuel cell if the location where a residual water content is equal to or greater than the threshold is located where liquid water can less easily be discharged, this being (i) a location closer to an inlet side than an outlet side of a reactant gas flow channel, or (ii) a location closer to a downstream side of a reactant gas flow in the cell lamination direction, and wherein the operation control unit is programmed to increase a current limiting value for the fuel cell if the location where a residual water content is equal to or greater than the threshold is located where liquid water can more easily be discharged, this being (i) a location closer to an outlet side than an inlet side of a reactant gas flow channel, or (ii) a location closer to an upstream side of a reactant gas flow in the cell lamination direction.

2. The fuel cell system according to claim 1, wherein when a residual water content equal to or greater than the threshold does not decrease or does increase over time, the operation control unit is programmed to decrease the current limiting value.

3. The fuel cell system according to claim 1, wherein the reactant gas flow channel includes a fuel gas flow channel for supplying fuel gas to the anode electrode and an oxidation gas flow channel for supplying oxidation gas to the cathode electrode, and the threshold differs between the side of the fuel gas flow channel and the side of the oxidation gas flow channel.

4. The fuel cell system according to claim 1, wherein the operation control unit is programmed to decrease the current limiting value for the fuel cell, as there is a larger amount of residual water content equal to or greater than the threshold.

5. The fuel cell system according to claim 1, wherein the estimating unit is programmed to estimate the residual water content distribution at startup of the fuel cell system, and the operation control unit is programmed to limit an electric current drawn from the fuel cell at startup of the fuel cell system.

6. The fuel cell system according to claim 1, wherein when a residual water content in the reactant gas flow channel estimated by the estimating unit is equal to or greater than the threshold, the operation control unit is programmed to limit an electric current drawn from the fuel cell after scavenging process on the fuel cell.

\* \* \* \* \*

UNITED STATES PATENT AND TRADEMARK OFFICE
CERTIFICATE OF CORRECTION

PATENT NO. : 8,916,303 B2  
APPLICATION NO. : 13/163234  
DATED : December 23, 2014  
INVENTOR(S) : Masahiro Okuyoshi et al.

It is certified that error appears in the above-identified patent and that said Letters Patent is hereby corrected as shown below:

In the Specification

At column 8, line 64, change "$RH=f(T_{d,CA}, I_{d,AN}, T_{OUT,i},$" to -- $RH=f(T_{d,CA}, T_{d,AN}, T_{OUT,i},$ --.

At column 10, line 47, change "$(T_{external\ air1} > T_{external\ air\ 1})$" to -- $(T_{external\ air1} > T_{external\ air\ 2})$ --.

At column 13, line 7, change "(28$a$, 28$b$)" to -- (27$b$, 28$b$) --.

At column 13, line 15, change "(28$a$, 28$b$)" to -- (27$b$, 28$b$) --.

In the Claims

At column 18, line 54, claim 1, change "to increase a current limiting value" to -- to increase the current limiting value --.

Signed and Sealed this  
First Day of September, 2015

Michelle K. Lee  
*Director of the United States Patent and Trademark Office*